United States Patent Office 3,663,493
Patented May 16, 1972

3,663,493
PROCESS FOR THE PRODUCTION OF MARBLE-
IZED REINFORCED POLYACRYLIC COMPOSI-
TIONS
Robert E. Miller, Ballwin, Mo., assignor to Monsanto Company, St. Louis, Mo.
No Drawing. Filed Dec. 29, 1969, Ser. No. 888,829
Int. Cl. B29c 21/00; C08f 29/50, 45/02
U.S. Cl. 260—31.8 M
9 Claims

ABSTRACT OF THE DISCLOSURE

Method for preparing marbleized inorganic filler reinforced polyacrylic composite products by the free radical catalyzed polymerization of an acrylic monomer in the presence of at least 25 and up to 90 weight percent of an inorganic particulate filler and a coupling agent to effect chemical bonding between the filler and the polymer; characterized by the addition to a moving monomer-coupling agent-filler slurry composition, which slurry composition may be partially polymerized prior to said addition, of ribbons of pigmented solid polymeric compositions consisting of a polyblend of a polyvinyl chloride-polyvinyl acetate copolymer with a polyalkyl methacrylate and plasticizer therefor together with one or more pigment additives in an amount to give the desired color and optionally containing one or more inorganic fillers and coupling agents of the same general nature as that present in the slurry composition, wherein said addition of the pigmented polymeric ribbons is effected just prior to casting and for a sufficient exposure time in the slurry to cause said ribbons to partially dissolve in said slurry and form color-shaded striations therein simulating the natural texture and coloration of variegated and banded marbles and other similar quarried rock.

BACKGROUND OF THE INVENTION

This invention is closely related to the subject matter set out in U.S.P. 3,324,074 directed to polymethacrylate systems reinforced with inorganic filler materials chemically bound thereto through a coupling agent and a process for preparing such compositions; the continuation-in-part application thereof, U.S.P. 3,442,851, further directed to a process for casting polyalkyl methacrylate sheets; U.S.P. 3,422,178 directed to a continuous polymeric sheet-casting machine and a process for utilizing said machine; and U.S.P. 3,448,073 directed to a process for the accelerated polymerization of ethylenically unsaturated monomers, including alkyl methacrylates, optionally also including a filler treated with an organosilane compound coupling agent; each of which aforesaid patents are incorporated by reference herein to avoid the redundant detailed description and exemplification of the disclosed compositions, processes and machines.

U.S. PATENT 3,324,074

More specifically U.S.P. 3,324,074 discloses polymeric compositions comprising an alkyl methacrylate polymer reinforced with an inorganic material which is chemically bound to the polymer through a trialkoxysilylalkyl acrylate coupling agent of the formula

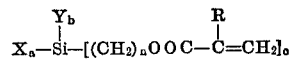

where R is hydrogen or alkyl, X is a hydrolyzable group such as halogen, alkyl carboxylate, alkoxycarbonyl, or a lower hydrocarbyloxy, radical, e.g. an alkoxy radical having from 1 to 6 carbon atoms, Y is a hydrocarbyl radical such as an alkyl radical, $n$ is an integer from 1 to 6, $a$ is an integer from 1 to 3, $b$ is an integer from 0 to 2, $c$ is an integer from 1 to 3 and the sum of $a+b+c$ equals 4.

The alkyl methacrylate polymers useful in such compositions include alkyl methacrylate homopolymers, copolymers and mixtures of homopolymers and copolymers. Suitable monomers include methyl methacrylate, ethyl methacrylate, n-propyl methacrylate, isopropyl methacrylate, propyl acrylate, 2-ethyl hexyl acrylate, butyl methacrylates. Preferred copolymers are prepared by the copolymerization of methyl methacrylate with one or more alkyl acrylates or alkyl methacrylates, e.g., ethyl acrylate, propyl acrylate, 2-ethyl hexyl acrylates, butyl methacrylate, lauryl methacrylate. Polymeric network structures, in distinction to the generally linear structures, are obtained by the use of alkyl methacrylate copolymer with polyfunctional methacrylates such as ethylene glycol dimethacrylate, propylene glycol dimethacrylate, butylene glycol dimethacrylate, polyethylene glycol dimethacrylate and trimethylolpropane trimethacrylate. Thus, the term "alkyl methacrylate polymer" as used therein, is intended to include alkyl methacrylate homopolymers and alkyl methacrylate copolymers of alkyl methacrylates with other alkyl methacrylates and/or alkyl acrylates. Alkyl methacrylate polymers also encompass the copolymers of an alkyl methacrylate with other monomers copolymerizable therewith, for example styrene, α-methyl styrene and other substituted styrenes such as the ring-substituted methyl styrenes, biallyl, acrylonitrile, maleic anhydride, 2-hydroxy alkyl methacrylates and methacrylonitrile.

The alkyl methacrylate polymers useful in the preparation of these novel compositions can be linear or crosslinked. Crosslinking provides some improvement in physical properties, particularly heat distortion temperature, but the linear polymers are also definitely included within the scope of this invention. The maximum amount of tolerable crosslinking in the polymer depends upon the proposed use of the finished composition. Increased crosslinking produces compositions with higher heat distortion temperature, but somewhat lower impact strength, and flexural strength. Consequently, control of crosslinking provides a variable which enables one to tailor the polymer to produce a composition of the desired properties. A suitable amount of crosslinking is that which will provide a polymer with an effective molecular weight around 20,000 or more, preferably 30,000 or more. Therefore a linear alkyl methacrylate polymer with a molecular weight around 20,000 or more may not need to be crosslinked whereas a lower molecular weight polymer, e.g. a polymer with a molecular weight of 5,000 or less, would be better utilized in the practice of this invention if it were crosslinked. Suitable crosslinking agents are well known in the art and can be used here in the conventional manner. Crosslinking can be achieved through the coupler, by hydrolysis of silanol groups, to form siloxane linkages, i.e.

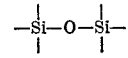

and by the use of polyfunctional monomers as described above.

The reinforcing agents are inorganic materials which are substantially insoluble in water, i.e. less soluble than 0.15 gram per liter. Such materials can be selected from a variety of minerals, primarily metals, metal oxides, metal salts such as metal aluminates and metal silicates, other siliceous materials, and mixtures thereof. Generally, those materials which have or can acquire an alkaline surface upon treatment with a base are best suited for the reinforced polymeric compositions. Since metal silicates and siliceous materials usually have or can readily acquire the desired alkaline surface, a preferred mixture for use in the invention is one which contains a major amount, i.e. more than 50% by weight, of metal silicates or siliceous materials. Materials with such characteristics are preferred because of the ease with which they can be coupled to the polymer. However, other substances such as alumina which are coupled to an alkyl methacrylate polymer by the use of higher levels of coupling agents, can be used as reinforcing components either singly or preferably combined with other minerals which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents and a feldspar-alumina mixture is also useful. Other materials particularly preferred as reinforcing agents are those materials with an alkaline surface such as wollastonite, which is a calcium metasilicate; asbestos, such as chrysolite, a hydrated magnesium silicate; crocidolite; and other calcium magnesium silicates. Other useful reinforcing agents include: quartz and other forms of silica, such as silica gel, ground glass, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides such as oxides of aluminum, tin, lead, magnesium, calcium, strontium, barium, titanium, zirconium, vanadium, chromium, manganese, iron, cobalt, nickel, copper, and zinc; heavy metal phosphates, sulfides and sulfates in gel form; and minerals and mineral salts such as spodumene, mullite, mica, montmorillonite, kaolinite, bentonite, hectorite, beidellite, attapulgite, graphite, chrysolite, garnet, saponite and hercynite.

The term "inorganic material" or simply "inorganic" refers to materials such as exemplified above. Particularly preferred are those inorganic siliceous materials which have or can acquire an alkaline surface upon treatment with a base and which have a 3-dimensional crystal structure as opposed to a 2-dimensional or planar crystal configuration. These siliceous materials are also characterized by a somewhat refractory nature with a melting point above about 800° C., a Moh's hardness of at least 4, and a water solubility of less than 0.1 gram per liter. Examples of preferred siliceous materials include minerals such as feldspar, quartz, wollastonite, mullite, kyanite, chrystolite, cristobalite, crocidolite, fibrous aluminum silicate having the formula $Al_2SiO_5$, spodumene and garnet. These minerals are especially desirable for use in reinforced polyalkyl methacrylate compositions for a number of reasons. For instance, they provide a composition with better abrasion resistance, flexural strength and modulus, tensile strength and modulus, impact resistance, resistance to heat distortion and resistance to thermal expansion than do conventional clay fillers and inorganic pigments such as whiting. Further, they provide higher loading levels than can be achieved with glass fibers, an important economic consideration. In addition, these highly loaded monomer slurries can be directly cast into a final polymerized form, thereby eliminating several processing steps necessary with glass fiber-reinforced compositions.

The amount of reinforcing agent to be used in the preparation of the polymeric composition can vary over a wide range with the maximum content being limited primarily by the ability of the polymer to bind the reinforcing medium into a cohesive mass. Techniques described therein have enabled the preparation of polymeric compositions containing as much as 85 or 90% by weight reinforcing agent.

The lower range of reinforcing agent concentration is limited only insofar as it is necessary to have sufficient inorganic material present to effect an improvement in physical properties of the polymeric composition. Consequently, inorganic concentrations as low as 25% by weight or less can be used. A preferable lower limit for the reinforcing agent, especially in the case of molded composition, is 30% by weight of the total composition, and more preferably 40% by weight. Suitable values for reinforcing agent concentration in the finished composition range from about 25 to 90%, preferably from about 40 to 90% and more preferably from about 50 to 90% by weight. Objects which are not to be subsequently reworked can be prepared with higher levels of reinforcing agent.

Particle shape and size of the reinforcing agent affect physical properties of the finished composition. In a preferred aspect, the reinforcing agent is admixed with a monomer or prepolymer and subsequently cast into a mold where the polymer is formed and cured. In such a method, the viscosity of the monomer or prepolymer-inorganic slurry becomes a limitation on the maximum amount of reinforcing agent which can be used, i.e. too high an inorganic concentration produces mixtures too viscous to cast into molds. This limitation on inorganic concentration imposed by viscosity is partly dependent upon the shape of the particulate inorganic. For example, spherical particles do not increase the viscosity of the monomer mixture as much as fibrous materials. By adjusting the particle shape of a reinforcer and thereby controlling the viscosity of the monomer mixture, it is possible to prepare improved castable or moldable polymeric compositions containing a very large amount of reinforcing agent.

Another factor which has an effect on the upper limit of inorganic concentration is the particle size distribution of the inorganic. A wide distribution of particle sizes provides a composition with a small amount of voids or spaces between the particles, thereby requiring less polymer to fill these spaces and bind the particles together. Proper combination of the two variables of particle shape and size distribution enables one to prepare highly reinforced compositions containing a major proportion of reinforcing agent.

Particle size distribution is a variable which has an effect on the degree of inorganic loading possible. Generally particles which pass through a 60-mesh screen are small enough to be used in such compositions. Particles as large as $1,000\mu$ (18 mesh) can be used with equal or nearly equal success, and particles as small as $0.5\mu$ have been successfully employed and particles in the range of 200 to 400 millimicrons can also be used. More descriptive of suitable particles than limits on particle size is a specification of particle size distribution. A suitable wide particle size distribution is as follows:

| | Percent |
|---|---|
| $250\mu$ or less (60 mesh) | 100 |
| $149\mu$ or less (100 mesh) | 90 |
| $44\mu$ or less (325 mesh) | 50 |
| $5\mu$ or less | 10 |

A narrower distribution also suitable for use in this invention is:

| | Percent |
|---|---|
| $62\mu$ or less (230 mesh) | 100 |
| $44\mu$ or less (325 mesh) | 50 |
| $11\mu$ or less | 50 |
| $8\mu$ or less | 10 |

A relatively coarse mixture useful in this invention has the following particle size distribution:

| | Percent |
|---|---|
| $250\mu$ or less (60 mesh) | 100 |
| $149\mu$ or less (100 mesh) | 90 |
| $105\mu$ or less (140 mesh) | 50 |
| $44\mu$ or less (325 mesh) | 10 |

A suitably finely divided mixture has the following particle size distribution:

| | Percent |
|---|---|
| 44μ or less (325 mesh) | 100 |
| 10μ or less | 90 |
| 2μ or less | 50 |
| 0.5μ or less | 10 |

These figures regarding particle size distribution should not be construed as limiting since both wider and narrower ranges of distribution will also be useful as well as both coarser and finer compositions. Rather these figures are intended as representative illustrations of inorganic compositions suitable for use in preparing the reinforced polymeric compositions.

The reinforcing agents perform a dual function in the finished compositions. Depending upon the material selected they may serve as an inexpensive addend to the polymer, thereby lowering the cost of the final product. Secondly, and more importantly, these inorganics, when bound to the polymer through a coupling agent, produce compositions with physical properties far superior to those of unreinforced polymers, thereby permitting their use in applications heretofore unsuited for the unreinforced polymers.

To achieve the benefits of this technology, namely the production of easily castable or moldable highly reinforced polymeric compositions plus lower costs from higher loadings of reinforcing agents, it is necessary that the reinforcing agent be substantially granular in shape rather than fibrous. However, a small amount of fibrous material may be incorporated into a polymer system if the amount of granular or acicular material is reduced by some proportionately larger amount. Alternatively, if pourability is not required, larger amounts of fibrous material can be included in the composition, thereby reinforcing the final product to an even greater extent.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. These methods of incorporation of glass fibers are known in the art and are mentioned here to demonstrate that the granularly reinforced polymers of this invention can be additionally reinforced by incorporation of fibrous materials according to techniques known in the art or according to the procedure described herein as applicable to granular reinforcing agents.

After optimum particle size distribution of the reinforcing agent is selected for a particular polymer system, it can be appreciated that an upper limit of reinforcing agent can be reached at which point the composition becomes too viscous to be poured into a mold or fed into a casting machine. The viscosity of monomer-inorganic slurries can be reduced by surfactants. Lowered viscosity permits the formation of a finer, smoother finished on the final product. Occasionally a finished composition with a high content of reinforcing agent e.g. greater than 70%, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. If a smooth finish is not a necessary feature for certain applications, then a decrease in viscosity permits incorporation of larger amounts of reinforcing agents into the monomer feed. Anionic, cationic, or nonionic surface active agents can be used to reduce the slurry viscosity and materials such as zinc stearate, long alkyl chain trimethylammonium halides, and alkylene oxide condensates of long carbon chain compounds have been used successfully.

An essential material in the preparation of this reinforced polymeric compositions is the coupling agent which binds the inorganic to the polymer. A coupling agent can be characterized by its functional groups wherein one group is capable of reaction with the monomer during polymerization and at least one group is capable of reaction with the reinforcing agent. Preferred for use with alkyl methacrylate polymers because of their clearly superior coupling capabilities are compounds of the formula

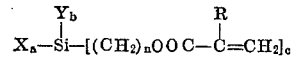

where R is hydrogen or alkyl, X is a hydrolyzable group such as halogen, alkyl carboxylate, alkoxy carbonyl or a lower hydrocarbyloxy radical, e.g. an alkoxy radical having from 1 to about 6 carbon atoms, Y is a hydrocarbyl radical such as an alkyl radical, $n$ is an integer from 1 to 6, $a$ is an integer from 1 to 3, $b$ is an integer from 0 to 2, $c$ is an integer from 1 to 3 and the sum of $a+b+c$ equals 4. Particularly preferred are coupling agents of the above formula where $a$ is 3, $b$ is 0, $c$ is 1, $n$ is at least 2, and X is a methoxy or ethoxy radical.

The inorganic and coupler are joined by contacting them in the presence of, or in the absence of, water, alcohol, dioxane, etc. Presumably, the hydrolyzable X group of the coupler reacts with the hydrogen atoms of appended hydroxyl groups attached to the surface of inorganic materials having an alkaline surface. Theoretically, these hydroxyl groups are present on the surface of, or can be deposited upon the surface of, most metallic and siliceous substances, thereby providing a site available for reaction with a hydrolyzable silane group. This theory of availability of hydroxyl groups on an inorganic surface may explain why many silicon-containing minerals are preferred reinforcing agents since the reaction of the hydrolyzable silane groups of the coupler with the silanol groups, i.e.

of the reinforcing agent produce the very stable siloxane linkage,

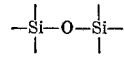

Regardless of any theoretical explanation advanced therein, the silane group is attached to the inorganic by contacting the two components. This composition is preferably but not necessarily dried. A chemical bond between the inorganic and coupler is thus probably obtained. This reaction of inorganic and coupler may be carried out separately, and the dried inorganic coupler adduct subsequently added to the monomer, or the reaction may be carried out in the presence of the monomer and the whole mixture dried to remove volatile reaction products. Preferably, heat is applied to a coupler-inorganic mixture to increase the extent of bonding.

As indicated, the alkylene bridge is present in a coupling agent because of the additional stability it contributes to the coupling agent. The X group can be any hydrolyzable group such as halogen, alkyl carboxylate, alkoxycarbonyl, or alkoxy radical. The Y group can be any hydrocarbyl group; the function of the Y group can be to modify the extent of the polymer-inorganic bond, to regulate viscosity of the monomer slurry, or it need not serve any function at all in the polymeric composition. Its presence may be due to a necessity or desirability to use a hydrocarbyl-substituted silane reactant in the synthesis of a silane coupler.

A reactive functional group on the coupling agent is required to bind the polymer and inorganic together by means of the coupling agent. An ethylenically unsaturated material can participate in the alkyl methacrylate polymerization to achieve the chemical bonding. Particularly preferred because of increased coupling capability are coupling agents containing a methacryloxy group attached to the silicon atom through an alkylene group wherein the alkylene group, if present, has from 1 to 6 carbon atoms. Suitable coupling agents include 2-trialkoxysilylethyl methacrylate, 3-tri-alkoxysilylpropyl methacrylate, and 4-trichlorosilylbutylacrylate where each alkoxy group has from 1 to about 6 carbon atoms.

The amount of coupler with which the reinforcing agent is treated is relatively small. As little as one gram of coupling agent per 1000 grams of reinforcing agent produced a polymeric composition with physical properties superior to those of a polymeric composition containing an untreated filler. Generally quantities of coupler in the range of 2.0 to 20.0 grams per 1000 grams of reinforcing agent have been found most satisfactory although quantities in excess of that range can also be used.

Catalyst systems preferred for the preparation of the reinforced polymeric compositions are obtained by the rapid catalytic decomposition of peroxygen compounds. Any material that activates a free radical-liberating material within a comparatively short time can be used. For example, a boron trihydrocarbyl, $BR_3$, can be used to activate a peroxygen compound to produce useful polymeric compositions. The activity of the $BR_3$ component is modified by the complexing effect of an amino compound as well as by the appropriate selection of the R radicals in $BR_3$.

As catalysts for inducing the polymerization reaction there may be used any compounds which will generate free radicals under the reaction conditions, although the peroxy compounds are preferred. Specific classes of compounds which can be used includes peroxides, such as diacetyl peroxide, acetyl benzoyl peroxide, dipropionyl peroxide, dilauryoyl peroxide, benzoyl peroxide, dimethyl peroxide, diethyl peroxide, dipropyl peroxide, tetralin peroxide, cyclohexane peroxide, acetone peroxide; hydroperoxides such as cyclohexyl hydroperoxide, cumene hydroperoxide, t-butyl hydroperoxide, methyl cyclohexyl hydroperoxide, hydrazine derivatives, such as, hydrazine hydrochloride, hydrazine sulfate, dibenzoyl-hydrazine, diacetylhydrazine, and trimethylhydrazinium iodide; amine oxides, such as, pyridine oxide, trimethylamine oxide, and dimethylaniline oxide; alkali metal and ammonium persulfates, perborates, and percarbonates; compounds containing the group $>C=N-$ and derived from ketaldones, i.e. a ketone or aldehyde, such as the azines (containing the group $>C=N-N=C<$) e.g., benzalazine, heptaldazine and diphenylketazine; oximes (containing the group $>C=NOH$) such as d-camphor oxime, acetone oxime, alphabenzil dioxime, butyraldoxime, alpha-benzoin oxime, dimethyl-glyoxime; hydrazones (containing the group $>C=N-N<$) such as benzaldehyde phenylhydrazone, phenylhydrazones of cyclohexanone, cyclopentanone, acetophenone, methone, camphor, and benzophenone; semicarbazones (containing the group $>C=N-NHCONH_2$) such as semicarbazones of acetone, methyl ethyl ketone, diethyl ketone biacetyl, cyclopentanone, cyclohexanone, acetophenone, propiophenone, camphor and benzophenone; Schiff's bases (containing the group $>C=N-$) such as benzalaniline, benzal-p-toluidine, benzal-o-toluidine, benzaldehyde derivatives of methylamine, ethylamine, and heptylamine, anils and analogous compounds of other amines, such as acetaldehyde anil, isobutyraldehyde anil, heptaldehyde anil, etc.; oxygen; and the reaction products of organometallics such as cadmium alkyls, zinc alkyls, tetraethyl lead, aluminum alkyls, etc. with oxygen.

These catalysts are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit can be emloyed.

Compounds that can be used as activators include the boron hydrides (boranes) and substituted boranes such as borane, diborane, triborane, tetraborane, trimethylborane, triethylborane, tripropylborane, trihexylborane, trioctylborane, tridecylborane, tri-tri-decylborane, tricyclohexylborane, triphenylborane, tribenzylborane, triphenethylborane, tri-monomethylbenzylborane, and tritolylborane. It is preferred to employ a trialkylborane of the formula $BR_3$, wherein R is an alkyl group of 1 to about 14 carbon atoms.

The boron compounds can be complexd with a basic complexing agent having an ionization constant from about $10^{-5}$ to about $10^{-11}$, preferably from $10^{-7}$ to $10^{-10}$. Particularly preferred are amino compounds having an ionization constant between $10^{-7}$ and $10^{-10}$, one notable example being pyridine. Other suitable amines which can be used include methylamine, di-methylamine, tri-methylamine, dimethylbutyl amine, n-octylamine, the picolines, anilinie, dimethylaniline, the toluidines, triethylenediamine and mixtures of several different amines. The mole ratio of amine to boron compound is within the range of 0.1:2 to about 10:1, and is preferably within the range of 0.5:1 to 2:1.

The catalyst system, a trialkylborane-complexing agent with peroxygen compound, permits a rapid polymerization reaction to high conversion without the risks of a runaway-type reaction. Although it is preferred to employ an amine as a complexing agent for the trialkylborane, other compounds can also be used for this purpose such as tetrahydrofuran and triphenylphosphine. For certain applications, oxygen or air can be substituted for the peroxygen compound.

Other catalyst systems can also be used in the preparation of the reinforced compositions, although their use generally requires a higher polymerization temperature and/or longer times. These systems include dimehylaniline/benzoyl peroxide, N,N-dimethyl-p-toluidine/benzoyl peroxide, the cobalt naphthenate/dimethylaniline/methyl ethyl ketone peroxide.

The reinforced polymeric compositions can be prepared by a rapid casting technique. By this procedure a fluid mixture containing monomer, reinforcing agent, coupling agent, and catalyst is charged to a mold, and a shaped solid product removed from the mold within a short time, or is introduced into the inlet reservoir of a continuous casting machine for sheet, tubing, bar stock, and the like. The system is adaptable to a rapid, controlled polymerization to produce complex shapes at moderate temperatures and pressures. Other processing techniques applicable to the reinforced compositions of this invention include compression molding, transfer molding, injection molding, and rotational and centrifugal casting.

In its broadest aspects, the process comprises reacting a silane coupling agent previously described in detail with an inorganic material to form an inorganic-coupler adduct, and then conducting a polymerization of an alkyl methacrylate in the presence of said adduct to prepare a methacrylate polymer chemically bonded to the inorganic through the coupler. The coupler can be prereacted with the inorganic prior to addition of the methacrylate monomer or it can be reacted with the inorganic using the alkyl methacrylate as a dispersing solvent. Substantial coupler-inorganic reaction is aided by application of heat in the range of 90 to 100° C. When the alkyl methacrylate monomer is used as a dispersing solvent a satisfactory technique for achieving good coupler-inorganic reaction comprises adding the coupler to the monomer, adding the inorganic to the mixture, stirring thoroughly and heating to 100° C., cooling the resultant slurry to 25° C., adding initiator and accelerator, and casting into a mold.

The unusual properties of the reinforced polymer compositions will suggest many uses for these materials to those skilled in the art. Since a hard, smooth surface can be obtained with a simple casting technique, table and counter tops can be prepared as well as billiard and pool table tops, and floor and wall coverings. The polymerization slurries can be used to prepare rotational castings to obtain intricate shapes, and for centrifugal castings of pipe and pipe linings. The slurries can also be modified to form thixotropic mixtures for lay-up moldings. Once cast, molding or sintering powders can be prepared.

U.S. PAT. 3,442,851

As noted above U.S. Pat. 3,442,851 issued on a continuation-in-part application from the parent application resulting in U.S. Pat. 3,324,074, supra. The alkyl methacrylate polymers, inorganic material reinforcing agents, coupling agents, and catalyst systems generally are the same as those set out in the parent patent.

The invention of the subject patent is directed to a process for casting acrylic sheet comprising polymerizing an alkyl methacrylate monomer in the presence of a free radical catalyst whose decomposition is accelerated by a complexed boron compound of the formula $Q \cdot BR_3$ where each R can be a hydrogen, hydrocarbon, hydrocarbonoxy, halogen, or $-OBR_2$ group and Q is a weakly basic complexing agent having an ionization constant in the range of about $10^{-5}$ to $10^{-11}$ and in the presence of at least 33% by weight inorganic material, said material being sufficiently dispersed and distributed throughout the monomer to serve as an effective heat sink for the exothermic heat of polymerization.

Additionally in place of the acryloxy group

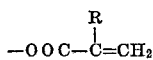

of the silane coupling agents this part of the compound can be designated by the symbol Z which, i.e.

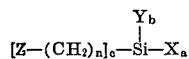

where Z is a radical interpolymerizable with a methacrylate monomer or reactive with a polyalkyl methacrylate polymer, examples being vinyl, allyl, acryloxy methacryloxy, and other radicals containing ethylene unsaturation, Y is a hydrocarbyl radical, X is a radical capable of reaction with the surface of an inorganic, examples being halogen, alkoxy, cycloalkoxy, aryloxy, alkoxycarbonyl, aryloxycarbonyl, alkyl carboxylate, aryl carboxylate, and hydroxyl radicals, $n$ is an integer from 1 to about 20, and $a$, $b$ and $c$ are as set out in the parent patent. It is also noted that preferably X is an alkoxy radical and Z is a methacryloxy group. Other examples of suggested silane couplers include vinyl triethoxysilane, vinyl methyldichlorosilane, di-(3-methacryloxypropyl) dipropoxysilane, and 6-acryloxyhexyl tricyclohexylsilane.

In addition to silicon-based couplers, phosphorus-based couplers comprise another class of reinforcing agents. These compounds, containing functional groups corresponding to the X, Y and Z, groups of the above formula, are adequately exemplified in U.S. Pat. No. 3,344,107. Other compounds useful as coupling agents include the coordinated chromium complexes which contain at least one polymer-reactive radical and at least one inorganic-reactive radical corresponding to the Z and X groups of the formula above. Examples include methacryloxychromic chloride, acryloxy chromic chloride, crotonyloxy chromic chloride, sorbyloxy chromic chloride, 3,4-epoxybutyl-chromic chloride, and methacryloxy chromic hydroxide. Other difunctional compounds useful as couplers include sodium salt of methacrylic acid, allyl chloride, methyl ester of 3,4-epoxybutanoic acid and 1-hexenol-6.

Other compounds which can be used as complexing agents for the trialkylborane catalyst system are beryllium hydroxide, strychnine, codeine, cocaine, novacain, toluidine and nicotine.

The disclosure regarding inorganic reinforcing agents is further expanded by noting that inorganic shape, size and size distribution are important considerations. Generally, the greatest improvements in mechanical properties are achieved by the use of fibrous inorganics such as glass fibers. For the inorganic to function as an effective heat sink, however, in the particular methacrylate polymerization under discussion when only 33% by weight inorganic is employed, it is necessary for the inorganic to be of such a shape and size to permit thorough dispersion. Particles which pass through an 18 mesh sieve of the U.S. sieve series (U.S. Bureau of Standards, Standard Screen Series, 1919) are capable of sufficiently good dispersion that a methacrylate slurry containing only 33% inorganic can be polymerized rapidly and smoothly. If 50 or 60 or 70% inorganic is used, the inorganic can be more fibrous in nature, of a larger size, or both. As a general rule, the upper limit on the size of inorganic is limited to the smallest dimension of the cast article. In the case of ¼ inch acrylic sheet, this would be ¼ inch. Usually, most of the inorganic is such that it will pass an 18 mesh sieve (1000μ). Particles as small as 100 or 200 millimicrons can also be used. Particle size distribution is a variable which permits good packing of inorganic to achieve high loadings and good heat sink characteristics.

It is also noted that another component which can be added to the monomer slurry to modify the properties of the cast methacrylate article is a rubbery polymer. The rubber can contribute to the impact strength of the finished composition. The rubbery polymer component can be used in quantities ranging up to about 15%, more preferably from about 1% to about 10%, by weight of the alkyl methacrylate polymer. Higher rubber contents are of course included within the scope of the invention, especially if the rubber selected is a partially degraded, low molecular weight rubber of low viscosity. Reinforced polyalkyl methacrylates having up to about 10% dispersed rubber based on the alkyl methacrylate can be readily prepared using techniques described in the examples set out in the subject patent. Handling difficulties are experienced when the rubber content is increased beyond 10 or 11%. Other techniques such as a pressurized injection into the mold are of course available and permit the polymerization of cast shapes of reinforced polyalkyl methacrylate having 20% or more dispersed rubber. The invention therein is limited in one preferred aspect, however, to compositions having a maximum of about 15% by weight dispersed rubber based on the alkyl methacrylate. This is because of the unsatisfactory flexural properties achieved at higher rubber concentrations. A maximum rubber concentration of 10% is particularly preferred because of the ease of casting and molding combined with the very extensive and satisfactory range of mechanical properties which can be achieved in reinforced methacrylates having from 1 to 10% dispersed rubber.

For convenience in preparing the reinforced compositions, selection of a rubbery polymer that is soluble in the alkyl methacrylate monomer system is preferred, although other rubbers not completely soluble can be used with some sacrifice in product uniformity. Suitable rubbery polymers include the polybutadiene rubbers, polyisoprene rubbers, styrene/butadiene rubber, natural rubber, acrylonitrile/butadiene rubber, butadiene/vinyl pyridine rubber, butadiene/styrene/vinyl pyridine rubber, polychloroprene, isobutylene/isoprene rubber, ethylene/vinyl acetate rubber, ethylene/propylene rubber and ethylene/propylene/conjugated diene rubber. Preferred are those rubbery polymers named above which contain little or no crosslinked gel.

The rubber must be thoroughly dispersed throughout the reinforced methacrylate composition. To achieve the maximum benefits of the invention, namely optimization of flexural strength and modulus as well as impact resistance by comparison to an unreinforced polyalkyl methacrylate, it is necessary that the rubber be interpolymerized into the methacrylate polymer chain. A simple blend of the polymeric components will not yield as satisfactory a combination of mechanical properties as will an interpolymer of the rubber and polyalkyl methacrylate. Simple noninterpolymerized reinforced methacrylate - rubber blends are nevertheless useful for certain applications where impact strength is not an essential feature. As an example, 1 to 5% of a saturated acrylic rubber, incapable of substantial interpolymerization, is useful in reinforced polyalkyl methacrylate floor tiles to prevent the yellowing that accompanies use of unsaturated rubbers. Retardation of settling of particulate reinforcement can also be achieved by use of noninterpolymerized dispersed rubbers.

It was further noted that a filled alkyl methacrylate sheet 3/16 inch thick can be cast in less than ten minutes, representing approximately a twelve-fold reduction in casting time by comparison to a similarly prepared unfilled sheet. Further, the accelerator and catalyst can be modified to provide a smooth, fast, trouble-free, room temperature polymerization.

The mechanical properties of the unreinforced filled acrylic sheets are as expected. The sheets are more rigid (higher modulus) but also weaker (lower tensile and flexural strengths) and more brittle (lower impact resistance). As a result, their use is restricted. The mechanical properties of the filled acrylic sheets can be upgraded considerably even to exceed the properties of an unfilled sheet by converting the inorganic filler to a reinforcing agent through use of a coupler.

The actual steps in the polymerization can be carried out in a number of ways. For instance, the inorganic and monomer can be mixed together in the presence of atmospheric oxygen which acts as a polymerization inhibitor. An organic hydroperoxide or other inefficient methacrylate polymerization catalyst can be added to the monomer-inorganic slurry followed by the complexed borane accelerator, after which addition the catalyzed slurry is cast into the molds. The advantage of such a procedure is that the molecular oxygen which acts as an inhibitor before the accelerator is added, acts as a catalyst after addition of the borane. Hence, the system operates to best advantage without the necessity for excluding or removing oxygen at some stage of the reaction. Alternatively, the accelerator can be added to an oxygen-free, uncatalyzed inorganic-monomer slurry followed by addition of the catalyst. Or both accelerator and initiator can be added to an oxygen-free system at 0° C. and then cast into a mold at some higher temperature. If a coupling agent is used, the coupler can be combined with the inorganic prior to or subsequent to addition to the monomer. Substantial coupler-inorganic reaction is aided by application of heat in the range of 90 to 100° C. When the alkyl methacrylate monomer is used as a dispersing solvent, a satisfactory technique for achieving good coupler-inorganic reaction comprises adding the coupler to the monomer, adding the inorganic to the mixture, stirring thoroughly and heating to 100° C., cooling the resultant slurry to 0° to 25° C., adding initiator and accelerator, and casting into a mold.

U.S. PAT. 3,448,073

As set out in U.S. Pat. 3,448,073 a typical prior art procedure for casting a 1/8 or 3/16 inch sheet of polymethyl methacrylate comprises adding 0.5% benzoyl peroxide to the uninhibited monomer and heating the mixture with agitation to about 90° C. for eight to ten minutes, followed by rapid cooling to room temperature. The prepolymer so formed can then be treated with plasticizers, fillers, dyes, pigments, stabilizers and the like, after which time the prepolymer is deaerated and either refrigerated or used immediately. When ready for casting, a flat sheet mold is filled with the prepolymer syrup and placed in an oven at 42° C. for 12 to 18 hours after which time the sheet is heated to 95 to 98° C. over a one hour period and held at this temperature for an additional 30 minutes.

From the description of the prior art processes it was apparent that the need in the polymerization casting of acrylic sheet was not for an accelerator to speed the reaction since this would result in a reaction even more difficult to control. Rather the need for some sort of catalyst system which was capable of regulating the polymerization—speeding it up in its initial and final stages and slowing it down during its intermediate stage. Paradoxically, the above need can be satisfied by proper choice of an accelerator in combination with the proper catalyst.

In view of the prior art problems and suggested solutions, it would be highly advantageous to devise an accelerator-catalyst system for an acrylic bulk polymerization which can effect a complete polymerization of an acceptable article in a relatively short period of time. It would be additionally advantageous if the acrylic monomer could remain unaffected by the accelerator-catalyst system for prolonged periods of time. It would also be advantageous if the accelerator-catalyzed monomer could be maintained in the unpolymerized state at room temperature and in the presence of air and moisture. Providing an accelerator-catalyst system which can perform in the above-described manner was the principal object of the invention. It was a further object of the invention to provide an accelerator for any polymerization which is catalyzed by a free radical mechanism, whether it be a bulk, suspension, emulsion, solution or other type of polymerization.

The invention of the subject patent was directed to a process for polymerizing ethylenically unsaturated monomers by a free radical mechanism comprising:

(a) Mixing together an ethylenically unsaturated monomer capable of free radical polymerization, a polymerization catalyst capable of decomposing to form free radicals, and an accelerator substance capable of decomposing to release sulfur dioxide.

(b) Releasing sulfur dioxide from said accelerator substance and thereby accelerating the formation of free radicals from said polymerization catalyst, and (c) Polymerizing said ethylenically unsaturated monomer in the presence of said free radicals.

Monomers capable of being polymerized in an accelerated free radical polymerization of the type described above include a wide variety of ethylenically unsaturated monomers, i.e. chemical compounds having a $>C=C<$ group within the molecule, including mono- and di-olefins, vinyl monomers, and the like. The accelerator-catalyst system described therein is particularly useful in the polymerization of acrylic monomers such as acrylonitrile, methacrylonitrile, alkyl acrylates and methacrylates such as methyl acrylate, methyl methacrylate, ethyl methacrylate, lauryl methacrylate and stearyl acrylate, acrylic and methacrylic acids, chloroethyl methacrylate, cyclohexyl acrylate and methoxymethyl methacrylate. In addition to homopolymers of the above monomers, the invention also included within its scope the copolymerization, terpolymerization and higher interpolymerization of the above or similar monomers with one another or with other monomers which cannot be readily homopolymerized by a free radical addition mechanism. Examples of monomers interpolymerizable by a free radical mechanism with some of the monomers set forth above include maleic anhydride, diethyl maleate, dimethyl fumarate and vinyloxyethanol. A further modification in the monomer system to be polymerized can be the dilution of the monomer in a quantity of polymer identical to that to be formed by polymerization of monomer. For instance, polymethyl methacrylate can be dissolved in monomeric methyl methacrylate. The resultant syrup can be polymerized into a solid shape more smoothly and readily than can the undiluted monomer.

The disclosed accelerator-catalyst system can be used to conduct a free radical polymerization in bulk, emulsion, suspension or solution. Conditions of temperature, pressure and time will vary considerably, depending upon the particular monomers being polymerized, upon the choice of polymerization system, and upon the interdependence of the variables themselves. Generally, those skilled in the art will recognize that the invention reduces the time required for any free radical polymerization under conditions of temperature and pressure comparable to the conditions employed in a unaccelerated polymerization. Alternatively, if equivalent time of polymerization is permitted, the accelerated polymerization can be conducted at a lower temperature or pressure or both than can the unaccelerated polymerization. Specific reaction conditions can be ascertained by reference to prior art free radical polymerizations, bearing in mind the effect of the accelerator upon the reaction.

Suitable catalysts for inducing the polymerization reaction and the relative amounts thereof are the same as set out in U.S. Pats. 3,324,074 and 3,442,851 both disclosed hereinabove.

Accelerators within the scope of the subject invention are those substances which are capable of releasing sulfur dioxide upon decomposition of the substance. The term "decomposition" should be construed broadly to include any change in the sulfur dioxide-containing substance which results in the release of free sulfur dioxide. For instance, sulfur dioxide can be adsorbed onto a molecular sieve and added to a catalyzed monomer or prepolymer system. Upon application of heat or some other technique to desorb the sulfur dioxide, the generation of free radicals by the catalyst will be accelerated by the action of the free sulfur dioxide upon the catalyst compound. The term "decomposition" as used therein included such a desorption reaction.

Preferred are those accelerator substances which are relatively stable and do not decompose spontaneously or almost spontaneously with but slight variations in temperature or pressure or in the presence of small quantities of moisture or air. Even through such sensitive substances can be used therein to advantage, they are not preferred for several reasons. For example, extra care must be exercised when it is desired to hold the catalyzed monomer in an unpolymerized state for any length of time if the accelerator substance is exceptionally unstable. Further, a too rapid release of sulfur dioxide during polymerization can cause a runaway reaction which could yield an unsatisfactory product. A substance capable of releasing sulfur dioxide gradually and at a controllable rate is highly preferred for use therein. If the release of sulfur dioxide can be controlled by externally manipulable reaction conditions such as temperature or pressure, so much the better; closer control of the sulfur dioxide release can be maintained.

It will be appreciated that several different accelerator substances can be used therein and that not every accelerator substance will be equally practicable for all free radical polymerizations. Examples of suitable accelerator substances which can be used in conjunction with a free radical catalyst include a number of inorganic salts which form definite addition compounds with sulfur dioxides. The adducts so formed correspond in type to hydrates and ammoniates with $SO_2$ groups substituted for $H_2O$ or $NH_3$ groups. As a rule, they dissociate readily at temperatures ranging from about 0 to 50° C. Molecular formulae of typical addition compounds include $NaI \cdot 4SO_2$, $KI \cdot 4SO_2$, $SrI_2 \cdot 4SO_2$, $BaI \cdot 4SO_2$, $LiI \cdot 2SO_2$, $NaI \cdot 2SO_2$, $SrI_2 \cdot 2SO_2$, $BaI \cdot 2SO_2$, $LiI \cdot SO_2$, $AlCl_3 \cdot SO_2$, $KSCN \cdot SO_2$, $KSCN \cdot \frac{1}{2}SO_2$, $RbSCN \cdot \frac{1}{2}SO_2$, $CsSCN \cdot \frac{1}{2}SO_2$ and $Ca(SCN)_2 \cdot \frac{1}{2}SO_2$. Another type of accelerator substance are those chemical compounds in which sulfur and oxygen are bonded to another moiety through chemical covalent bonds and which yield free sulfur dioxide upon disruption of the covalent bonds. Examples include 2,5-dihydrothiophene 1,1-dioxide (3-sulfolene), tetrahydrothiopene-1,1-dioxide (sulfolane), and other dienesulfone adducts such as isoprene sulfone, hexadiene sulfone and cyclopentadiene sulfone. Other types of sulfur dioxide-releasing compound are inorganic sulfites and bisulfites such as sodium bisulfite, ammonium sulfite and titanium sulfite. A third type of accelerator substance are those materials having sulfur dioxide adsorbed on some adsorbent such as a molecular sieve. Examples of molecular sieves operable as adsorbents include those synthetic crystalline metal alumino-silicates belonging to a class of minerals known as zeolites. As synthesized, the crystals contain water of hydration which can be driven out by heating. Sulfur dioxide can then be adsorbed into the pores vacated by the water and can be held there until released by heating.

Thus, the accelerator substance must make available free sulfur dioxide for reaction with the catalyst if it is to function as an effective accelerator, and the sulfur dioxide can be liberated by the application of heat or withdrawal of pressure or by a chemical substitution reaction or by other means. The amount of accelerator substance is governed by the amount of free sulfur dioxide it is capable of generating. Generally, the amount of sulfur dioxide can vary from a very small quantity up to ten times the molecularly equivalent amount of catalyst. Even larger quantities of sulfur dioxide can be supplied but no appreciable benefit is obtained from the use of such excessive amounts. Usually a molar quantity ranging from 0.5 to about 5 times the molar quantity of catalyst is used.

To provide the greatest advantages in the use of the present invention, i.e. the ability to hold a catalyzed accelerated monomer slurry in an unpolymerized state for an indefinite time and then polymerize it rapidly and easily to produce an acceptable article, it is desirable that the catalyst be one which does not decompose spontaneously to any substantial extent at temperatures approximating the holding temperature. It is further desirable that the catalyst itself be relatively unaffected by the temperatures of polymerization but that it react readily with sulfur dioxide to yield free radicals at the temperature of polymerization. In the polymerization temperature range from about −20° to about 120° C., the organic hydroperoxides are particularly suitable catalysts for vinyl free radical polymerizations when combined with a suitable accelerator substance. Accelerator substances preferred for use with a hydroperoxide-catalyzed acrylic bulk polymerization are the diene sulfone adducts of the formula

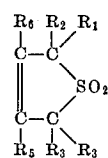

where the R's are hydrogen, alkyl, aryl or alkaryl groups, preferably having up to 8 carbon atoms. In one embodiment, a quantity ranging from about 0.1 to about 0.5 millimole of an organic hydroperoxide per mole of monomer and a quantity of a diene sulfone adduct sufficient to yield approximately twice an amount of sulfur dioxide molecularly equivalent to the hydroperoxide can be added to an alkyl methacrylate monomer and the resultant monomer mix held for more than sixteen hours at any temperature up to about 70° C. without causing any appreciable polymerization. Optionally, fillers, fibers, stabilizers, dyes, pigments, inorganic materials, coupling agents, and other non-polymerizable materials can also be added along with the catalyst and accelerator substance. When desired, the monomer mix can then be cast into a mold maintained at 90 or 100° C. Polymerization will proceed smoothly to produce a finished sheet up to ½ inch or more in thickness in less than two hours. If a large quantity of filler with a relatively large heat capacity, e.g. 20% by volume inorganic mineral, is used, it is possible to shorten the polymerization time to 10 minutes or less.

U. S. PATENT 3,422,178

Whereas unitary sheet molds are disclosed or suggested in the foregoing itemized patents, U.S. Pat. 3,422,178 is primarily concerned with a machine and process for the continuous polymerization casting of polymeric sheet compositions. The continuous polymeric sheet casting machine of the subject patent can be briefly described as comprising a framework, first and second endless belts positioned in face-to-face relationship to each other for a portion of their lengths to form between their inside surfaces a mold cavity having an entrance and an exit, means attached to said framework and operatively associated with said belts for bringing said belts into face-to-face relationship at the entrance of said mold cavity, means attached to said framework and operatively associated with said belts for disrupting the face-to-face relationship of said belts at the exit of said mold cavity, belt driving means operatively associated with said belts, and mold cavity restraining means with temperature controlled platens operatively associated with the outside surfaces of those portions of said belts forming said mold cavity, said restraining means being positioned to provide a mold cavity having a non-uniform thickness in its longitudinal dimension and a uniform thickness in its transverse dimension said mold cavity comprising a first zone having a certain average thickness, a second zone having an average thickness greater than the first zone, and a third zone having an average thickness less than the second zone.

A further aspect of the invention is a process for continuously casting a polymeric sheet or film comprising casting a liquid feed into a moving mold cavity, expanding and contracting said feed as it is moved through said mold, converting said liquid feed to a solid polymer while said feed is being moved through said mold cavity, and withdrawing said polymeric sheet from the exit of said mold cavity.

The liquid feed can be either a molten polymer or a fluid monomer or prepolymer system. Generally, any thermoplastic resin which can be heated to form a fluid melt can be cast in the manner described above and molded into a finished sheet. Examples of suitable polymers are given including acrylic resins such as polymethyl methacrylate and polyethyl acrylate, and the like. Also useful herein are copolymers and interpolymers of the monomers used to prepare the disclosed resins.

The process of the invention can also be practiced, utilizing any of a number of various monomer systems to produce either thermoplastic or thermosetting polymeric sheet. The number and variety of monomer systems usable therein is limited only by the capability of the casting machine to function as a suitable reaction vessel for the systems. Examples of monomers particularly preferred for use therein because of their normally liquid state at suitable polymerization temperatures, their rapid polymerization time and general adaptability to use with the casting machine as shown in the disclosed figures, include the acrylic esters such as the lower alkyl methacrylates and acrylates.

In addition to utilizing monomers and polymers in the process, it is also possible to prepare mixtures of monomer and polymer for continuous casting in the machine described above. For instance, polymethyl methacrylate can be dissolved in monomeric methyl methacrylate to prepare a feed of proper viscosity. The mixture can then be charged to the casting regions of the machine where the monomer is polymerized and the whole mass solidified into a finished sheet. Or a polymer-monomer system can be selected to provide a polymer insoluble in a monomer at one temperature but miscible at a higher temperature, the net result being that a fluid suspension of polymer in monomer can be poured into the top of the mold, heated rapidly to form a viscous gel, and the monomer polymerized as the semisolid gel moves through the mold. An example of such a system is a polyvinyl chloride-methyl methacrylate mixture.

The liquid polymer or monomer feed can also have incorporated therein a quantity of an inorganic filler or fibrous reinforcement, examples being the inorganic materials and coupling agents set out within the disclosures of the foregoing patents. If the liquid feed is in the monomeric state, it may be desirable to add various catalysts, polymerization accelerators, cross-linking agents, stabilizers, plasticizers, pigments, dyes and other additives to the monomer slurry before casting. Liquid polymers may advantageously be cast by incorporation of some of the above or other additives.

Residence time in the mold cavity can vary, depending upon the speed of the belts, the temperature conditions within the casting region and the time required for solidification of the particular system chosen. The examples set out therein describe some preferred sets of conditions.

When a filler is incorporated into the liquid feed to form a slurry, a vertical positioning of the belts when they are arranged in face-to-face relationship is particularly preferred. A vertical positioning of the mold cavity provides a sheet having an even distribution of filler throughout its dimensions. A horizontal or diagonal positioning of the casting region, on the other hand, will ordinarily provide a sheet having a filler-rich side and a polymer-rich side, especially if the specific gravity of the filler differs from the specific gravity of the liquid feed. For certain special uses, a finished sheet having a polymer-rich and a filler-rich side may be desirable; but for most uses, a uniform product is preferred, hence the preference for the vertical positioning of the casting region.

The thickness of the mold cavity, i.e. the distance between that portion of the moving belts in face-to-face relationship can vary along the length of the mold. In general, monomer systems require a mold profile different from a mold profile suitable for preformed polymers being cast. And each monomer or polymer system will be best accommodated by a mold contour which provides for expansions and contractions due to external heating and cooling as well as due to polymerization exotherms and passage through glass transition temperatures. As can be readily recognized optimum mold contours will vary considerably, depending upon the particular liquid feed being used.

Some means of restraining the liquid feed within the casting region until it has solidified enough to keep from running out is necessary. As shown therein the casting region can be sealed with a tubular gasket such as rubber tubing which is located along the edges of the belts and is pressed between the belts to form a leakproof seal. The gasket can be either stationary or can move along with the belts. It is possible that the feed can be chosen to provide a semisolid or solid sheet shortly after introduction to the mold, in which case the tubular gaskets need enclose only a portion of the mold cavity.

Conversion of liquid feed to a solid polymer can be accomplished merely by cooling the feed if it is a molten polymer. If the feed contains monomer, conditions should be such that the finished material emerging from the machine is substantially polymerized. This can be achieved by proper combination of feed temperature upon introduction to the temperature zones within the mold, residence time within the mold and catalyst or curing systems.

After solidification of the polymeric sheet, the mold closure is opened by the continued motion of the endless flexible belts around rotating drums at the exit of the machine. As the belts are rotated around the drums back toward the mold entrance, the finished polymeric sheet emerges for whatever post-treatment is deemed advisable, if any.

DESCRIPTION OF THE INVENTION

This invention relates to the preparation of stone-like synthetic marbleized compositions preferably in sheet form particularly suitable for architectural use as floor and wall tile or sheeting. The preferred base composition is a polyacrylic resin loaded with from about 25 up to 90 weight percent of an inorganic particulate material chemically bonded to the resin through a coupling agent. Suitable polyacrylic monomers, inorganic materials, coupling agents, polymerization catalysts and the process and apparatus means for fabricating sheet composites therefrom are known to the art as fully set out in the above-identified patents incorporated by reference herein and described in substantial detail hereinabove. In addition to the various limitations set forth in the aforementioned patents, a few further concentration ranges for some of the components used herein should be mentioned. One preferred catalyst concentration for use herein is up to about 2 weight percent of the alkyl methacrylate monomer. A preferred amount of coupling agent for use in this invention, expressed in percentages, can be from about 0.05 to about 2% by weight of the inorganic filler. Solid, finely divided particulate polyvinyl chloride polymer, when used in conjunction with the alkyl methacrylate monomer as shown in the subsequent examples, can be used in an amount of up to about 100% by weight of the alkyl methacrylate monomer. The essence of the instant invention is the further addition to a fluid slurry composition comprising such monomers, inorganic materials, coupling agents and catalysts of from about 0.5 to about 15 weight percent and preferably from about 2 to about 5 weight percent, based on the slurry composition, of a specific class of pigmented solid polymeric ribbons consisting of a polyblend of polyvinyl chloride/polyvinyl acetate copolymer with one or more polyalkyl methacrylates and a plasticizer therefor. Such pigmented solid polymeric ribbons are introduced into the slurry composition at a critical time interval prior to the conversion of the monomer slurry composition to a hard solid inorganic mineral reinforced polymeric composite product sufficient to effect partial dissolution of said ribbons in the moving fluid slurry compositions and provide random three-dimensional color streaking of the finished composite product simulating the appearance of natural marbles and other architectural dimensional stone.

By the optional selection of the reinforced inorganic material component of the system which provides the general background color of the finished composite product and the various pigmented color ribbons, one can readily fabricate synthetic marbleized composites simulating white, pearl, beige, bluish, green, pink, red, grey, black, etc. natural marbles, and for decorative effects color combinations not normally found in nature. Additionally depending on the relative ratio of pigmented color ribbons to the slurry composition the composite product can be made to simulate the highly ornamental banding of the onyx marbles generally called Mexican onyx or cave onyx, the serpentine marbles, and the like.

Whereas the instant invention is primarily concerned with the prorduction of a stone-like synthetic marbleized composite in flat sheet form for use in various dimensional sizes as floor tile, wall tile, etc., it will be appreciated that the slurry composition can be cast in any desirable form including stair treads, baseboards, windowsills, fireplace mantels and hearths, balsters, column sections, bookends, paperweights, objects of art, lampbases, hot plates, counter- and table-tops, washbasins, shower stalls, tubs, and the like. Obviously the more complex the shape of the object, the more costly the necessary mold and composite object. Additionally various complex objects might more readily be produced by proper design of a plurality of different casting molds each adapted to produce a component part of the final article to subsequently be assembled from the various component parts. However the usual objects can readily be produced in a single casting operation and the flat smooth or textured sheet products can be cast in a unitary fixed dimension sheet mold, or as a continuous sheet with predetermined thickness and width and variable lengths as desired for any particular end use.

The use of highly polished mold surfaces will provide a highly polished finish to the composite. Similarly any desired texturing or surface design of the composite material can be provided by a corresponding mold design. Additionally the high abrasion resistance of the composites make them particularly useful in areas having a high traffic pattern, e.g. hallway, corridor, elevator, subway car, supermarket and department store floors and the like. In such applications the flooring resists much of the normal scuff marking and stains associated with various other commercial flooring and when soiled can be readily cleaned. Furthermore, if desired, the composite compositions can be sanded, buffed and polished to provide a new surface and, since the differential color effect provided by the selected pigmented ribbon additives are incorporated into the composite product in a three-dimensional manner, any wear or attrition during subsequent polishing operations does not remove the marbleized effect as is the case in those prior art products where only a thin surface coating of a marbleized pattern is applied to a variety of supporting backing materials.

Depending on the desired design effect the pigmented ribbon can be added to the slurry composition in several stages of the process. Furthermore the time, degree and type of agitation of the slurry subsequent to addition of the pigmented ribbon thereto will in large measure affect the final pattern of the composite product. Thus during the relatively short time interval that the pigmented ribbon additive is being partially dissolved and bled into the slurry background color and the relative motion between the slurry and ribbon will determine whether the marbleized pattern will tend toward stripes, zig-zag, swirls, or other ornamental configurations. Particularly with regard to the continuous sheet casting process the slurry reservoir can by fed by gravity flow or a low-pressure injection system. Additionally the feed rate of slurry-pigment composition to said reservoir can be geared to the feed rate of the slurry-pigment composition into the continuous casting machine in such manner that only a small volume of feed is present in the reservoir at any one time precluding any substantial further mixing during the dwell time therein. In such manner the patterns established by the mixing and/or feed operation tend to be preserved and then are permanently set in the composite product during polymerization of the mixture in the continuous casting machine. Thus the banded or striped patterns will be favored by simply feeding the mixture to the reservoir through a conduit that minimizes any mixing action other than substantially linear flows; zig-zag patterns will be favored by a similar mixing action with the exception that the mixture is introduced into the reservoir through a plurality of low-pressure nozzles, which nozzles are adapted to oscillate in a transverse motion at right angles to the mixture flow into the casting machine, i.e. at right angles to the direction of the motion of the endless belts forming the mold surfaces of the casting machine; and the swirl patterns can be provided in similar manner to the zig-zag procedure, except that the plurality of low-pressure nozzles are programmed to effect a circular or elliptical motion across the face of the endless belts forming the mold surfaces of the casting machine. Obviously the more nozzles placed in closer relationship one to another will require a lower rate of slurry feed containing the pigmented ribbons per nozzle, i.e. the rate of feed of the sum of the nozzles should remain relatively constant for any given speed of the belt and setting of the casting machine controlling the thickness of the cast sheet, and varied proportionally in relation to any different belt speed and/or thickness of the desired cast sheet. Additionally it will be apparent the more nozzles that are employed the smaller the circle or ellipse traced by an individual nozzle may be and the smaller the diameter of any individual swirl pattern. Furthermore, it is within the skill of the art to intermittently feed a plurality of individual or banks of such nozzles in a predetermined manner to deliver the desired quantity of pigmented ribbon-slurry composition to the traveling belt to provide a uniform layer of such composition across the face of said traveling belt. Said plurality of nozzles also can be displaced from the right angle straight line projection across the face of said belt in any suitable manner to effect the delivery of a substantially uniform layer of the pigmented ribbon-slurry composition to said belt. The feed from the mixer or mixers through the delivery means to the belt in the reservoir section of the sheet-casting machine must be at a sufficient rate to completely fill the space between the traveling belts, or to provide a small volume surplus of the ribbon-slurry composition at the nip of the two converging belts, whereby the space between the essentially parallel traveling belts will always be completely filled.

In accordance with the foregoing description it will be seen that the manner of feed to the traveling belt can be modified in numerous ways to control the pattern desired both as to type and as to whether a generally symmetrical or random pattern will be produced. It will also be understood that each nozzle need not be connected to the same feed, but that the selection of colors of pigmented ribbon added to the base slurry composition can be varied as desired to provide two or more different color base feeds and effect a greater range of color striations in the finished product. Similarly two or more different background colors can be provided with a plurality of modified slurry compositions to provide even further variations in color of the final product. Additionally, particularly for relatively thick cross-section sheets, a portion of the slurry composition can be added to the traveling flexible belt without the addition of any pigmented ribbon and then the remaining portion of the slurry containing the pigmented ribbon deposited on the surface thereof, whereby solely as an illustrative example the top about ⅛" of a ⅜"-sheet might contain the marbleizing pigmented ribbon and the approximately ¼"-base section of such sheet would be free from the marblesized structure. Sheet material prepared in the foregoing manner would of course offer an architectural product with two different, but color compatible surfaces, which could be installed in various harmonious floor and wall designs as desired. A further alternative method of fabricating the foregoing dual-faced sheet material entails the deposition of the base composition on the face of one of the traveling belts and the pigmented-ribbon modified slurry to the face of the second traveling belt whereby the slurry layers carried by the two belts are sandwiched together as they enter and pass through the casting region. When such alternative is employed doctor bars can be employed parallel to the face of each of the converging belts and set to meter the desired proportional volume of slurry to each belt control the total volume of slurry at the entry zone of the casting machine to assure a continuous full feed, but preclude any excess buildup and mixing of the two slurry feeds at the nip of the drum rolls, i.e. at the converging portion of the belts forming the entrance to the mold cavity.

For special effects as desired a thin continuous layer of clear, transparent resin also can be coated on one or both surfaces of the cast sheets, preferably as a secondary treatment of the cast sheet. Also random or patterned designs of one or more different color-based slurry compositions can be applied to the second belt prior to contact at the entrance to the mold cavity with the bulk of the slurry composition deposited on the first belt thereby providing an "inlaid" effect of such design. This variant also can be effected in similar manner to transfer by offset printing, or other means.

When it is desired to minimize gravitational flow of the slurry in the direction of belt travel, eg., when said slurry is fed to the surface of one of the belts as said belt is in contact with the top drum roller, it will be apparent to one skilled in the art that one can operate the casting machine in a tilted or diagonal position, e.g. such that the sheet formed in the casting region may be at a 45° angle. Under the foregoing conditions the distance and thereby also the time of belt travel is reduced and the angle of repose of the slurry will vary from 0° to a maximum angle of 45° at the inlet to the mold cavity, rather than the maximum 90° angle of repose when the casting machine is operated in the vertical position. Additionally, any gravitational flow of the slurry prior to its entry into the advancing continuous mold cavity can be controlled to a large degree by regulating the casting process to deliver the slurry composition to the belt at the higher end of the slurry viscosity range, e.g. of the order of from about 20,000 to about 30,000 centipoise, or higher (apparent viscosity with Brookfield viscometer at 2 to 4 p.p.m.).

PRODUCTION OF PIGMENTED RIBBONS

Suitable pigmented ribbons for use in the preparation of the marbleized compositions of this invention can be produced in the following manner.

A mixture of from about 15 to about 35 weight percent polyvinylchloride/polyvinylacetate copolymer (copolymer ratio of from about 80/20 to about 95/5), e.g. Bakelite VYHH resin 2766; about 1 to about 15 weight percent of a polyalkyl methacrylate such as poly-n-butylmethacrylate, e.g. Elvacite 2044; about 15 to about 35 weight percent coupled particulate mineral, e.g. "Supersil" silicon dioxide or wollastonite calcium metasilicate coupled with about 1.2 g. $\gamma$-methacryloxypropyltrimethoxysilane per kilogram mineral; and up to about 35 weight percent of one or more selected pigment materials were all blended together in a P–K Twin Shell Dry Blender for approximately 45 minutes, or for such time suitable to provide a substantially uniform mixture. Other mechanical apparatus for effecting the mixing of dry materials can of course be used for the twin shell blender, e.g. tumblers, ribbon mixers, double cone mixers, and the like. Then the dry blended mixture may be transferred to a suitable mixer for handling wet solid compositions such as the shear-bar mixers, including those with counter-rotating agitators, ribbon mixers, kneaders such as the Banbury mixers, pug mills and the like, and from about 5 to about 30 and preferably from about 10 to about 25 weight percent of a liquid plasticizer, e.g. "Santicizer" B–16 m-butylphthalyl butylglycolate, added thereto, preferably by spray application to the agitated dry-mix composition, and mixing continued to obtain a damp sand-like mixture. Said damp sand-like mixture is then fed to a screw extruder and extruded through one or more slits (about 0.015" high and about 0.25" wide) onto a cooling pan, dusted with a finely divided filler-reinforcing agent component such as wollastonite, the coated cooled ribbon picked up on a conveyor belt and the ribbon run through a rotary cutter to provide pigmented ribbon sections having a length of about 1.0"±⅛". Dusting the extruded ribbon decreased the surface tackiness and provided sufficient body for cutting said ribbon.

Preferably said damp sand-like mixture should be extruded within a time period of about 3 hours after mixing to preclude a tendency for the damp mixture to ball up or agglomerate. The damp mixtures generally are fed to the extruder through a hopper feed fitted with mechanical means, e.g. agitation by moving mechanical arms within the hopper body, vibrators, and the like, to avoid arching or bridging of the damp mixture in the hopper and assure continuous feed to the extruder and extruded at the minimum temperature required to obtain a smooth flow through the narrow die slit opening. Usually control of the extruder barrel and die temperatures at from about 50° to 80° C. was satisfactory, but somewhat higher or lower temperatures can be employed depending on the components and particular weight ratio thereof of any particular pigmented ribbon composition. Because certain of the fillers, reinforcing agents or pigments may be abrasive the material of construction for the extruder die should be selected to minimize any such abrasive action, e.g. crucible steel (grade Rex M25 high speed) heat-treated to a hardness of about 60–64 Rockwell C was found suitable. Additionally, since the vinyl component of the ribbon composition is water sensitive, it is preferable that the mixing operations be carried out in the absence of moisture-containing air, cooling after extrusion be effected with cool dried air or a dry inert gas, and to preclude any extended exposure to moist air the cut ribbon sections should be stored in moisture resistant containers, e.g. sealed polyethylene drum liners, until ready for use with the base slurry composition.

The pigmented ribbons preferably are produced in a manner to provide a relatively uniform-sized product to maintain a substantially uniform solution or bleeding rate of the pigmented ribbon in the base monomer-containing slurry composition. It was found that ribbon sections 0.25″±0.0625″ in width, 0.016″±0.002″ in thickness, and 1.0″±0.125″ in length were particularly suitable for the preparation of the marbleized compositions of this invention. Additionally, for any given size of ribbon section it will be understood that relative uniformity in thickness is most critical, since this dimension is controlling in obtaining the necessary uniformity in solution or bleeding rate in the slurry composition.

The polyalkyl methacrylates which can be used in the formulation of the pigmented ribbon sections usually are present in an amount from about 7.5 to about 15 weight percent or more of the pigmented ribbon composition and can be selected from the illustrative class of alkyl methacrylate polymers set out in U.S. Pat. 3,324,074 incorporated by reference and referred to hereinabove. n-Butyl methacrylate is the preferred specific monomer for the preparation of the polyalkyl methacrylate for use in this invention, but other related monomers may be used in whole or in part, e.g. monomers defined by the illustrative structural formula:

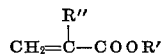

wherein R′ is a lower alkyl radical normally containing up to about 12 and preferably up to about 4 carbon atoms, such as methyl, ethyl, n-propyl, isopropyl, isomeric butyl groups, 2-ethylhexyl, n-octyl, decyl, lauryl, and the like; and R″ is H or methyl.

As earlier noted the polyvinyl chloride/polyvinyl acetate copolymer, or polyblend, composition normally is present in an amount of from about 20 to about 35 weight percent of the pigmented ribbon and the ratio of polyvinyl chloride:polyvinyl acetate can vary from about 60:40 to about 96:4 and preferably such ratio is in the general area of about 85:15. Such copolymer compositions are commercially available, or can be readily prepared in known manner.

Plasticizers for the polyvinyl chloride/polyvinyl acetate-polyalkyl methacrylate polyblends of the pigmented ribbon compositions generally comprise about 8 to about 25 and preferably from about 9 to about 18 weight percent of said compositions. Suitable plasticizers are dibutylphthalate, dioctylphthalate, dibutoxyethylphthalate, tributylphosphate, trioctylphosphate, tricresylphosphate, dibutylsebacate, dioctylsebacate, polypropylene glycol sebacate, dioctyl adipate, polypropylene glycol adipate, m-butyl phthalyl butylglycolate ("Santicizer" B–16), and the like.

The pigments or color bodies incorporated into the ribbon compositions should be stable materials usually employed in amounts of from about 1 to about 35 and more preferably from about 2 to about 12 weight percent of the ribbon composition. Such pigments are added in a finely divided form, normally all passing through a 200-mesh screen (U.S. standard sieve series), although it should be understood that larger particle-size materials can be used, and usually several such pigments are blended together to get the desired color. Both the inorganic and relatively inert organic pigments can be used. Examples of suitable pigments are titanium dioxide, magnesium silicate, lithopone, burnt sienna, burnt umber, ochers, carbon black, black iron oxide, barium sulfate, cadmium sulfide, chrome yellows, chrome oranges, zinc yellow, chrome greens, cadmium yellows, metallic browns, zinc oxide, zinc sulfide, calcium sulfate, barium yellow, antimony trioxide, antimony vermilion, azurite, cobalt blue, Venetian reds, cadmium reds, cinnabar, cuprous oxide, calcium carbonate, zinc tetroxychromatic, ultramarine blues, iron blues, cobalt violet, cobalt yellow, cobalt green, Egyptian blue, hematite, limonite, copper phthalocyanine, chlorinated copper phthalocyanine, copper polyphthalocyanine, and the like.

Finally for best results the base slurry composition should have a viscosity of at least about 5000 centipoise, and preferably from about 20,000 to about 30,000 centipoise before adding the pigmented ribbon thereto. If the slurry viscosity is extremely low the pigmented ribbon may become excessively dissolved therein and tend to merely modify the background color of the base composition. Similar end results are obtained if the exposure time of the pigmented ribbon in the base slurry composition is excessive or the mixing action incorporating the ribbon into the slurry is extreme. Thus a gentle mixing action is preferred to minimize incorporating air or other gas into the reaction mixture and provide a sufficient shearing action to effect the desired degree of bleeding of the pigmented ribbon into the base slurry composition. The optimum exposure time will vary somewhat depending on the particular pigmented ribbon and base slurry compositions, but in general exposure times of from about 10 to about 30 minutes from the time of adding the pigmented ribbon to the base slurry composition to the time of entry of the mixed composition into the initial stage of the casting region have been found to be suitable. In any event the optimum exposure time for any particular formulation can be readily determined by one skilled in the art from the interrelating considerations set out in this disclosure.

From said considerations it will also be understood that only a relatively small volume of pigmented ribbon-base slurry composition is prepared at any one time. Furthermore the mixing operation preferably should be effected in positive displacement mixing apparatus to provide essentially uniform mixing action and time for all portions of the run. Suitable means to implement the foregoing procedure include the use of an enclosed screw conveyor wherein the pigmented ribbon and base slurry composition are introduced separately in the desired proportions to the feed end of such conveyor; other equipment similar to injection molding machines; small-volume batch mixers coupled with delivery means, e.g. gravity-activated trough or conduit, screw conveyor, and the like; and other similar means. One further variant of the process includes a deaeration step under partial vacuum to remove or reduce any gases entrapped in the mixed composition during the mixing operation.

Whereas the marbleized compositions of this invention normally are readily removed from the mold, and in the case of sheet materials fabricated in the continuous-casting machine the endless flexible belts of said machine normally are readily released from the surfaces of the marbleized sheet compositions, it should be understood that if any particular composition may not possess a clean structural surface, such problem can be overcome by the use of a mold release agent applied to the surfaces of the molds or the flexible belts. Metal salts of higher saturated fatty acids containing from about 7 to about 20 carbon atoms are suitable mold release agents for this purpose. Illustrative examples of suitable metal salts of higher saturated fatty acids for use in this invention are for example the lithium, sodium, potassium, beryllium, magnesium, calcium, strontium, barium, zinc, aluminum, lead and other related metal salts of enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, and arachidic acid, such as sodium, potassium, zinc and lead enanthate; sodium, potassium, zinc and lead caprylate; potassium, calcium, zinc and lead pelargonate; lead caprate; lead undecanoate; lithium, potassium, sodium, calcium, magnesium, barium, zinc and lead laurate; sodium and magnesium tridecanoate; lithium, potassium, magnesium, barium, zinc and lead myristate; sodium and magnesium pentadecanoate; lithium, potassium, sodium, calcium, magnesium, barium, zinc, aluminum and lead palmitate; sodium and magnesium margarate; lithium, potassium, sodium, beryllium, magnesium, calcium, barium, zinc, aluminum and lead stearate; sodium and magnesium nonadecanoate; sodium, magnesium, zinc and lead arachidate; and the like.

Also the mold or belt surfaces in contact with the marbleized compositions can be coated with "Teflon," tetrafluoroethylene polymer, to effect an improved clean release of the molded object. It should also be understood that a cleaning step can be introduced into the procedure, if the contacting surfaces of the mold contains any foreign substance in the sense that such substance may adversely affect the clean removal of the marbleized object from the mold surface. Said cleaning step, if desired, can be continuously effected on the return cycle of the flexible belt in the continuous-casting machine.

Another alternate means of providing special surface effects to the marbleized sheet material is the use of an overlay sheet continuously fed into and directly supported by the endless flexible belts of the casting machine. Such overlay sheets can be applied to one or both endless belts of the continuous casting machine, as desired. Examples of such auxiliary overlay sheets are aluminized kraft paper, and other sheet material which may be used to transfer decorative patterns, provide an embossing effect or surface structure, and the like. Such sheeting materials normally are stripped from the marbleized compositions when the compositions emerge from the casting machine.

The following examples are illustrative of the present invention and in no way are intended as restrictive of the scope of the invention set out herein. Additionally all "parts" set out in the examples are expressed in terms of parts by weight of the particular composition, unless otherwise specified.

EXAMPLE 1

A reaction mixture consisting of 1100 parts of a composition containing 7 parts of "Hycar" 1432 butadiene/acrylonitrile rubber copolymer (about 67:33) per 100 parts of methylmethacrylate monomer, 25 parts tetraethylene glycol dimethacrylate cross-linking agent, 3 parts "Tergitol" NP-27 nonionic surfactant prepared from 1 mole nonyl phenol with 7 moles ethylene oxide, and 17.5 parts of 50% 2,4-dichlorobenzoylperoxide catalyst compounded with dibutyl phthalate was added to a closed reaction vessel. Said reaction vessel was fitted with a stainless steel anchor-type stirrer, a cooling condenser connected to a vacuum line, a nitrogen purge-line vent, and means to add further components thereto and to discharge the reaction mixture. The aforesaid mixture was agitated by stirring at about 600 r.p.m. until the catalyst component was dissolved. Then the agitation was slowed to 100 r.p.m. and 75 parts $TiO_2$ pigment, 0.2 part ultramarine blue pigment, and 2400 parts of particulate 200-mesh "Supersil" silicon dioxide reinforcing agent precoupled with 0.0681 weight percent γ-methacryloxypropyl trimethoxysilane (Z-6030) were added to the reaction vessel and the mixture stirred for 10 minutes at 300 r.p.m. During the course of the foregoing formulation of the viscous slurry mixture the reaction vessel and contents were at ambient temperature (about 21° C.). The said slurry was then subjected to a reduced pressure, a vacuum of about 60 mm. mercury, for 30 minutes with continued stirring at about 300 r.p.m. to evacuate any air or other gaseous components trapped in the slurry mixture. Said vacuum then was released to normal atmospheric pressure by slowly bleeding dry nitrogen into the reaction vessel. The foregoing uniform pigmented methylmethacrylate/coupled mineral reinforcing agent slurry formulation comprises the base slurry composition for the white colored background marbleized composition.

Three pigmented ribbon compositions for use with the foregoing base slurry composition were prepared by blending together 11.35 parts "Elvacite" 2044 poly-n-butylmethacrylate, 31.85 parts "Bakelite" VYHH polyvinyl chloride/polyvinyl acetate copolymer (ratio PVC:PVA about 87:13), 34.10 parts "Supersil," supra, 1.0 part "Mark"-99 barium-cadmium salts of fatty acids vinyl plastic stabilizer, and 0.5 part "Mark"-C phosphite ester of aliphatic alcohol organic chelating agent for use with said stabilizer in a P-K blender for about 45 minutes to provide a base recipe. Then said base recipe (77.30 parts) was blended with three pigment materials (viz, 0.5 part F-8635 olive green pigment, 0.5 part F-5687 blue turquoise pigment, and 0.01 part burnt umber BU-5250-F comprising about 49–54% $Fe_2O_3$, 10% $MnO_2$ and balance $SiO_2$ and silicates) and 19 parts "Santicizer" B-16 m-butylphthalyl butyl glycolate plasticizer uniformly mixed therein to give a damp-sand-like, or friable damp-dough-like, sage-green mixture. A second similar composition was prepared by blending 77.3 parts of said base recipe with other pigment material (viz, 0.8 part G-4099 chrome green chromium oxide, 0.05 part CP-2311 light chrome yellow coprecipitated lead chromate and lead sulfate, and 0.1 part burnt umber BU-5250-F) and 19 parts "Santicizer" B-16 uniformly mixed therein to give a damp-sand-like yellow-green mixture. Each of the aforesaid sand-like, or dough-like, mixtures were extruded within 3 hours of formulation by charging to a screw extruder with the barrel and die temperatures controlled at about 70 to 75° C. during the extrusion operation and fitted with a plurality of narrow slit extrusion orifices 0.015" high and 0.25" wide to provide an endless ribbon with the aforesaid dimensions. The hot extruded ribbon was deposited onto a belt conveyor, dusted with calcium metasilicate to decrease tackiness and facilitate handling, cooled with dry air (or any inert gas) and fed to a continuous rotary cutter machine. The rates of extrusion, belt conveyor travel, and cutting were controlled to provide ribbon sections approximately 1"±⅛" in length and the pigmented ribbon sections were stored in closed containers free from moisture until needed in the formulation of the marbleized composition.

Nineteen (19) parts of each of the above-described sage-green and yellow-green pigmented ribbon sections were added to the foregoing base slurry composition while stirring the entire reaction mixture at about 100 r.p.m. Then the reaction vessel was closed, again evacuated to 60 mm. mercury, stirred for about 5 seconds at 300 r.p.m. to distribute the pigmented ribbon sections throughout the slurry, then stirred at about 100 r.p.m. for about 20 minutes to effect controlled bleeding of the pigmented ribbon in the slurry and said slurry then fed to the continuous-casting machine and the mineral-reinforced methylmethacrylate slurry polymerized in known manner in said casting machine to provide a greenish striated marbleized white background colored mineral-reinforced polymethylmethacrylate sheet material characterized by high stain resistance, extremely high wear resistance and ready cleanability, whereby said sheet material is suitable for decorative floor and wall tile and related applications.

EXAMPLE 2

In the similar fashion to Example 1 a base slurry composition was prepared by mixing 550 parts of a 100 methylmethacrylate: 7 "Hycar" 1432 mixture with 25 parts tetraethylene glycol dimethacrylate, 1.5 parts "Tergitol," 10 parts 50% 2,4-dichlorobenzoylperoxide catalyst compounded with dibutylphthalate, 9 parts $TiO_2$ pigment, 2.6 parts P–437 tan pigment, and 1050 parts "Supersil."

Also the pigmented ribbon compositions were prepared in similar manner to Example 1 by blending together 11.35 parts poly-n-butylmethacrylate, 31.85 parts polyvinyl chloride/polyvinyl acetate copolymer, 34.10 parts "Supersil" precoupled as noted in Example 1, 2 parts "Mark"-99 stabilizer, and 1 part "Mark"-C chelating agent for use with said stabilizer to provide the base recipe. Then 80.3 parts of said base recipe was blended with three pigment materials (viz, 0.8 part chromium oxide G–4099, 0.05 part light chrome yellow pigment CP–2311, and 0.1 part burnt umber), and 16 parts "Santicizer" B–16 plasticizer uniformly mixed therein to give a damp sand-like mixture, which was extruded and treated in similar manner to Example 1 to give yellow-green pigmented ribbon sections for use with the above base slurry composition.

A second olive-green ribbon composition was prepared from 77.3 parts of the base recipe blended with three pigment materials (viz, 0.5 part F–8635 olive green pigment, 0.5 part F–5687 blue turquoise pigment, and 0.01 part burnt umber) and 18 parts "Santicizer" B–16 plasticizer uniformly mixed therein to give a damp-sand-like mixture, which was extruded and treated in similar manner as set out above to provide a supply of olive-green pigmented ribbon sections.

Then 15 parts of each of the above yellow-green and olive-green pigmented ribbon sections, 1.8 weight percent of the total reaction mixture, were incorporated in the base slurry composition in similar manner to Example 1 and the reaction mixture poured into a vertical press mold with the stainless steel facing sheets spaced approximately $7/16''$ apart while the mold was subjected to a vibrator to facilitate the complete filling of said mold. Then the vibration procedure was terminated and the platens supporting the stainless steel facing sheets heated to about 93° C., the mixture allowed to exotherm, and the thick polymethylmethacrylate mineral-reinforced sheet cooled and removed from the press. The greyish background colored product with greenish marbleized pattern bore an excellent resemblance to natural marble and was characterized by similar desirable properties to those set out for the product of Example 1.

EXAMPLE 3

In similar fashion to Example 1 another base slurry composition was prepared by mixing 1100 parts of a 100 methylmethacrylate: 7 "Hycar" 1432 mixture with 20 parts tetraethylene glycol dimethacrylate, 12 parts 50% 2,4-dichlorobenzoyl peroxide catalyst compounded with dibutyl phthalate, 7.2 parts $TiO_2$, 5.3 parts P–437 tan pigment, 0.75 part F–10568 coral chromium-aluminum-iron oxides pigment, and 2100 parts "Supersil" precoupled as in Example 1.

Three pigmented ribbon compositions for effecting the colored marbleizing effect were produced in similar manner to the procedure set out in Example 1. The white ribbon sections were formulated from 77.3 parts of the base recipe, 20 parts of $TiO_2$, and 17 parts of "Santicizer" B–16; the sand ribbon sections were formulated from 77.3 parts of the base recipe with 2.6 parts $TiO_2$, 10.5 parts F–4988 yellow zirconium-vanadium oxides pigment, and 19 parts "Santicizer" B–16; and the salmon ribbon sections were formulated from 77.3 parts of the base recipe, 1.7 parts $TiO_2$, 10.24 parts F–10568 coral pigment, 0.08 part pimento red pigment (Kentucky Color Div. Harshaw Chemical Co.), 0.09 part burnt umber, 0.16 part R–3098 iron oxide red ($Fe_2O_3$), and 20 parts "Santicizer" B–16.

Then 80 parts of the white ribbon sections, 40 parts of the sand ribbon sections, and 20 parts of the salmon ribbon sections were incorporated into the base slurry composition in similar manner to Example 1, and the reaction mixture fed to the continuous-casting machine and polymerization of the methylmethacrylate effected in the casting region of said machine wherein the heated platens were held at about 90° to 93° C. during the course of the passage of the reaction mixture through said machine and emerge as a marbleized beige background colored mineral-reinforced polymethylmethacrylate sheet material. The white, sand and salmon-rust striations introduced by the controlled bleeding of the pigmented ribbon sections in the base slurry composition were observed to produce a very natural marbleizing effect to the sheet product.

EXAMPLE 4

Another base slurry composition was prepared in a similar manner to Example 1 by mixing 218 parts of a 100 methylmethacrylate: 7 "Hycar" 1432 mixture with 10 parts tetraethylene glycol dimethacrylate, 3.48 parts 50% 2,4 dichlorobenzoyl peroxide catalyst compounded with dibutylphthalate, 1.7 parts $TiO_2$, 0.01 part light chrome yellow pigment CP2311, 0.22 part F–1924–B peach manganese-aluminum-titanium oxide pigment, and 440 parts "Supersil" precoupled as in Example 1. Then 30 parts of white, 20 parts of sand, and 8 parts of salmon pigmented ribbon sections were incorporated into the base slurry composition and thereafter the reaction mixture was fed to the continuous-casting machine in similar manner to Example 1 to produce a beige background colored mineral-reinforced polymethylmethacrylate $1/8''$ thick sheet product having a natural marbleized flow pattern throughout the entire body of said product, said pattern being created by the controlled bleeding of the pigmented ribbon sections into the base slurry composition.

The pigmented ribbon section compositions used in this example were prepared in similar manner to Example 1 and said compositions respectively contained the following components:

(1) white—23.53 parts polyvinyl chloride/polyvinyl acetate copolymer, 9.25 parts poly-n-butylmethacrylate, 23.53 parts precoupled wollastonite (calcium metasilicate), 33.61 parts $TiO_2$, and 10.08 parts "Santicizer" B–16; (2) sand—77.3 parts of the base recipe employing precoupled wollastonite, 10.5 parts F–4988 yellow pigment, 2.73 parts $TiO_2$, and 20 parts "Santicizer" B–16; and (3) salmon—77.3 parts base recipe employing precoupled wollastonite, 1.5 parts F–10568 coral pigment, 1 part $TiO_2$, 0.2 part iron oxide red ($Fe_2O_3$) R–3098, 0.2 part pimento red pigment, and 18 parts "Santicizer" B–16.

EXAMPLE 5

A base slurry reaction mixture was prepared in similar manner to Example 1 consisting of 1100 parts of a composition containing 7 parts of "Hycar" 1432 rubber copolymer per 100 parts of methylmethacrylate monomer, 25 parts tetraethylene glycol dimethacrylate, 3 parts "Tergitol" surfactant, 17.5 parts 50% 2,4-dichlorobenzoyl peroxide catalyst compounded with dibutylphthalate, 18 parts $TiO_2$, 5.2 parts tan pigment P–437 and 2000 parts precoupled "Supersil." Then 110 parts of white, 30 parts of bronze, and 50 parts of mustard colored pigmented ribbon sections were incorporated into the base slurry composition and the entire reaction mixture was fed to the continuous-casting machine in similar manner to Example 1. The finished marbleized sheet product had a light cream background coloration with natural appearing banded color markings simulating a dense travertine marble.

The pigmented ribbon compositions used in this example were prepared in similar manner to Example 1 and said compositions respectively contained the following components:

(1) white—77.3 parts base recipe, 45 parts TiO$_2$, and 20 parts "Sanitizer" B-16; (2) bronze—77.3 parts base recipe, 38.7 parts yellow G.S. pigment F-4988, 22.8 parts coral pigment F-10568, and 17 parts "Santicizer" B-16; and (3) mustard—77.3 parts base recipe, 38.7 parts yellow pigment C-420 tin-vanadium-titanium oxides, 0.45 part yellow G.S. pigment F-4988, 0.22 part burnt umber pigment BU-5250-F, and 15 parts "Sanitizer" B-16.

EXAMPLE 6

A base slurry grey background reaction mixture was paired in similar manner to Example 1 consisting of 1100 parts of a composition containing 5 parts "Diene" 35NF stereo-specific polybutadiene rubber polymer per 100 parts methylmethacrylate monomer, 25 parts tetraethylene glycol dimethacrylate, 16 parts 50% 2,4-dichlorobenzoyl peroxide catalyst compounded with dibutyl phthalate, 26 parts TiO$_2$, 0.05 part blue stain pigment C-252 cobalt-aluminum oxides, 0.05 part black stain pigment E-6331 manganese-iron-copper oxides, and 2000 parts pre-coupled "Supersil." Then 80 parts of white, 15 parts of sage-grey, and 40 parts of sand colored pigmented ribbon sections were incorporated into the base slurry composition and the entire reaction mixture was fed to the continuous-casting machine in similar manner to Example 1 to produce a marbleized sheet product having a light-grey background with light-bluish-green and dark grey natural appearing color markings.

The pigmented ribbon compositions used in this example were prepared in similar manner to Example 1 and said compositions respectively contain the following components:

(1) white—77.3 parts base recipe, 20 parts TiO$_2$, and 17 parts "Santicizer" B-16;
(2) sage-grey—77.3 parts base recipe, 10.24 parts TiO$_2$, 0.17 part black stain pigment F-6331, 0.09 part burnt umber BU-5250-F, 1.7 parts olive green pigment F-8635, and 15 parts "Santicizer" B-16;
(3) sand—77.3 parts base recipe, 2.65 parts TiO$_2$, 11 parts yellow G.S. pigment F-4988, and 17 parts "Santicizer" B-16.

EXAMPLE 7

Three pigmented ribbon section compositions were formulated in similar maner to Example 1 wherein the relative components therein were as follows:

(1) white—28 parts "Bakelite" VYHH polyvinyl chloride/polyvinyl acetate copolymer, 28 parts wollastonite (calcium metasilicate—average particle size 4.1 microns), 11 parts poly-n-butylmethacrylate, 30 parts TiO$_2$, and 15.5 parts "Santicizer" B-16;
(2) bronze—the same first three components and amounts as under "white" above, 14.2 parts yellow pigment F-4988, 7.6 parts coral pigment P-10568, and 26 parts "Santicizer" B-16; and
(3) mustard—same first three components and amounts as "white" above, 14 parts yellow pigment C-420, 8 parts yellow pigment F-4988, 0.015 part burnt umber BU-5250-F, and 20 parts "Santicizer" B-16.

Thereafter a polymerizable monomer/mineral slurry was prepared in similar manner to Example 1 by mixing 1070 parts of a mixture containing 7 parts "Hycar" 1432 butadiene/acrylonitrile rubber copolymer per 100 parts of methylmethacrylate monomer, 40 parts ethylene glycol dimethacrylate, 12 parts t-butyl peroxypivalate (75% solution in mineral spirits) polymerization catalyst, 18 parts TiO$_2$, 5.2 parts tan pigment P-437, 2100 parts pre-coupled "Supersil" silicon dioxide with average particle size of 5.8 microns, and after mixing and evacuation of occluded gases as set out in Example 1 portions of the foregoing pigmented ribbon compositions were added thereto, viz, 60 parts white, 40 parts bronze, and 40 parts mustard. The complete formulation mixture was then run through the continuous-casting machine to obtain the mineral coupled polymethylmethacrylate product in sheet form (about 1/8" thick) characterized by a color banded structure similar to the tinting observed in travertine marble usually caused by iron and copper oxides being present during the deposition of the calcium carbonate in the natural geological processes.

EXAMPLE 8

Three pigmented ribbon section compositions were prepared in similar manner to Example 1 wherein the relative components therein were as follows:

(1) white—77.3 parts base recipe, 20 parts TiO$_2$, and 16 parts "Santicizer" B-16;
(2) sage-grey—77.3 parts base recipe, 10.24 parts TiO$_2$, 0.17 part black stain pigment F-6331, 0.09 part burnt umber BU-5250-F, 1.7 parts olive green pigment F-8635, and 15 parts "Santicizer" B-16; and
(3) sand—77.3 parts base recipe, 2.6 parts TiO$_2$, 10.5 parts yellow G.S. pigment F-4988, and 18 parts "Santicizer" B-16.

Thereafter a polymerizable monomer/mineral slurry was prepared in similar manner to Example 1 by mixing 1100 parts of a mixture containing 5 parts of a stereo-specific polybutadiene polymer ("Diene" 35NF) per 100 parts methylmethacrylate monomer, 25 parts tetraethylene glycol dimethacrylate, 16 parts 50% 2,4-dichlorobenzoyl peroxide catalyst compounded with dibutyl phthalate, 26 parts TiO$_2$, 0.05 part blue pigment C-252, 0.05 part jet black pigment F-6331, and 2100 parts precoupled "Supersil." Said slurry was homogeneously mixed and occluded gases evacuated, then portions of the foregoing pigmented ribbon compositions were added thereto and partially dissolved therein in similar manner to Example 1, viz, 80 parts white, 20 parts sage-grey, and 45 parts sand. The complete formulation slurry mixture containing the partially dissolved pigmented ribbons was then charged to the continuous-casting machine to obtain the grey marbleized mineral-coupled polymethylmethacrylate product in sheet form.

EXAMPLE 9

Two pigmented ribbon section compositions were prepared in similar manner to Example 1 wherein the relative components therein were as follows:

(1) olive-green—77.3 parts base recipe, 0.5 part olive-green pigment F-8635, 0.5 part blue turquoise pigment F-5687, 0.02 part burnt umber BU-5250-F, and 17 parts "Santicizer" B-16; and
(2) yellow-green—77.3 parts base recipe, 0.8 part chrome green pigment G-4099 chromium oxide, 0.05 part light chrome yellow pigment CP-2311, 0.1 part burnt umber BU-5250-F, and 16 parts "Santicizer" B-16.

Then a polymerizable monomer/mineral slurry was prepared in similar manner to Example 1 by mixing 1100 parts of a mixture containing 5 parts of a stereo-specific polybutadiene polymer ("Diene" 35NF) per 100 parts methylmethacrylate monomer, 30 parts ethylene glycol dimethacrylate, 16 parts 50% 2,4-dichlorobenzoyl peroxide catalyst compounded with dibutylphthalate, 75 parts TiO$_2$, 0.2 part ultramarine blue pigment F-8233, and 2200 parts precoupled "Supersil". Said slurry was homogeneously mixed and occluded gases evacuated, then 20 parts of each of the foregoing olive-green and yellow-green pigmented ribbon compositions added thereto and partially dissolved therein in similar manner to Example 1. Such mixed composition containing the partially dissolved pigmented ribbons was then charged to the continuous-casting machine to obtain the white marbleized mineral-coupled polymethylmethacrylate product in sheet form.

EXAMPLE 10

Another white marbleized mineral-coupled polymethylmethacrylate product in sheet form was produced by the continuous-casting of a slurry mixture prepared in similar manner to Example 1.

First pigmented olive-green and yellow-green ribbon section composition were prepared respectively from 77.3 parts base recipe employing precoupled wollastonite, 0.7 part olive green pigment F–8635, 0.5 part blue turquoise pigment F–5687, 0.04 part burnt umber BU–5250–F, and 17 parts "Santicizer" B–16 for the former, and 77.3 parts base recipe, 0.8 part chrome green pigment G–4099, 0.15 part light chrome yellow pigment CP–2311, 0.15 part burnt umber BU–5250–F, and 17 parts "Santicizer" B–16 for the latter. Each of the aforesaid pigmented ribbon compositions were added in an amount of 13 parts to a slurry composition prepared by mixing 1050 parts of a mixture of 7 parts "Hycar" 1423 butadiene/acrylonitrile rubber copolymer per 100 parts methylmethacrylate monomer, 50 parts tetraethylene glycol dimethacrylate, 10 parts 75% solution t-butyl peroxypivalate in mineral spirits, 75 parts $TiO_2$, 0.02 part ultramarine blue pigment F–8233, and 2200 parts precoupled "Supersil."

The ⅛" sheet white marbleized product prepared from the foregoing formulation in the indicated manner, like the similar marbleized sheet products prepared in each of the foregoing illustrative examples, is particularly useful as decorative floor and wall tile, counter and vanity tops, and other applications where the excellent wear resistant and stain resistant properties of the product can be utilized.

As noted herein the specific formulation for any of the pigmented ribbon compositions can be varied over reasonably wide limits depending on the desired color effect. Additionally even specific desired color effects do not require an extremely narrow compostion range, e.g. as illustrative examples the white pigmented ribbon can be formulated from a composition containing from about 45 to about 60 parts base recipe, from about 15 to about 35 parts $TiO_2$, and from about 10 to about 20 parts "Santicizer" B–16; sage-grey pigmented ribbon can be formulated from a composition containing from about 60 to about 75 parts base recipe, from about 8 to about 12 parts $TiO_2$, up to about 0.25 part black stain pigment F–6331, from about 0.05 to about 0.2 part burnt umber BU–5250–F, from about 1 to about 3 parts pigment F–8635, and from about 10 to about 20 parts "Santicizer" B–16; and sand pigmented ribbon can be formulated from a composition containing from about 55 to about 70 parts base recipe, from about 2 to about 4 parts $TiO_2$, from about 8 to about 14 parts yellow pigment F–4988, and from about 15 to about 22 parts "Santicizer" B–16, etc. Obviously other similarly colored pigments may be substituted for any particular itemized pigment and different ranges of the pigments may be required to obtain the desired final color effect as would be apparent to one skilled in the art.

The hereinabove disclosed synthetic saturated elastomeric polymers of the base reactant slurry employed to prepare the marbleized composite products in conjunction with the pigmented ribbon compositions can be substituted in whole or in part by from about 0.5 to about 100, preferably from about 5 to about 80, more preferably still from about 5 to about 50, and with a particularly useful range of from about 10 to about 33 weight percent, all based on the alkyl methacrylate monomer, of a solid finely divided particulate polyvinyl chloride resin. Such polyvinyl chloride resin can be readily prepared in known manner by suspension or spray-dried emulsion polymerization of the vinyl chloride monomer and other production means, e.g. see applicant's (together with R. J. McManimie and G. L. Wesp) copending application Ser. No. 705,896, filed Feb. 16, 1968, which application is incorporated herein by reference. Said particulate polyvinyl chloride preferably has a maximum particle size of about 50 microns and a minimum average particle size of about 10 microns or less, e.g. about 0.1 to 10 microns. Thus the particulate polyvinyl chloride component generally will substantially all pass through a 325-mesh sieve (44 microns) of the U.S. Sieve Series.

Illustrative examples of the reactant base slurry containing particulate polyvinyl chloride are set out as follows.

EXAMPLE 11

In similar manner to Example 1 32 parts of a polybutadiene rubber ("Diene" 35NF), 15 parts of tetraethyleneglycol dimethacrylate, 3.6 parts of t-butyl peroctoate, 405 parts of 325-mesh calcium metasilicate and 525 parts of 200-mesh "Supersil" silicon dioxide, wherein the minerals were pretreated with 0.25% 3-trimethoxysilylpropyl methacrylate, 300 parts of spray-dried emulsion grade polyvinyl chloride ("Opalon" 410), and 5 parts of titanium dioxide were added to 289 parts of methylmethacrylate. The slurry was thoroughly mixed to provide a homogeneous mixture, evacuated to remove any occluded gases and was then ready for the introduction of the selected pigmented ribbon compositions for the preparaton of the marbleized product.

EXAMPLE 12

In similar manner to Example 11 another reactant base slurry was prepared by the addition of 500 parts of 10-micron "Minusil" quartz pretreated with 0.4 weight percent of 3-trimethoxysilylpropyl methacrylate, 350 parts of suspension grade polyvinyl chloride having an average particle size of 10 microns, and 4.2 parts of 2,4-dichlorobenzyl peroxide to 500 parts of methylmethacrylate. The mixture is then thoroughly stirred to prepare a uniform slurry for subsequent treatment and addition of the desired pigmented ribbon strips for the production of the marbelized product.

EXAMPLE 13

In similar manner to Example 11, 15 parts of an emulsion spray-dried polyvinyl chloride of less than 2 micron particle size, 500 parts 200-mesh precoupled "Supersil," and 5 parts of t-butyl peroxypivalate were added to 500 parts of methylmethacrylate and mixed to provide a uniform slurry for use with the pigmented ribbon sections to produce the marbleized composition.

EXAMPLE 14

In similar manner to Example 11, 100 parts of emulsion grade spray-dried polyvinyl chloride of 2 micron maximum particle size, 35 parts of an acrylonitrile-butadiene rubbery copolymer "Hycar" 1442, 40 parts of ethylene glycol dimethacrylate, 8 parts of 2,4-dichlorobenzoyl peroxide, 500 parts of a 50:50 mix of 325-mesh calcium metasilicate and 10-micron quartz, wherein the minerals were pretreated with 0.5% 3-trimethoxysilylpropyl methacrylate, were added to 500 parts of ethylmethacrylate. The mixture was treated in similar manner to the foregoing examples to provide a homogeneous slurry suitable for use as the base composition with the pigmented ribbon sections to produce a marbleized product.

EXAMPLE 15

In similar manner to Example 11, 4 parts of polybutadiene rubber "Diene" 35NF, 10 parts of tetraethylene glycol dimethacrylate, 10 parts of titanium dioxide, 50 parts of a spray-dried emulsion grade polyvinyl chloride having a maximum particle size of 2 microns, 30 parts of magnesium oxide, 395 parts of 325-mesh calcium metasilicate and 685 parts of 200-mesh "Supersil" silicon dioxide, wherein each of the minerals is precoupled, and 2 parts of t-butylperoxy pivalate were added to 256 parts of methylmethacrylate. The foregoing base reactant mixture was mixed to provide a homogeneous slurry suitable for the incorporation therein of the desired quantities and color variations of pigmented ribbon sections to produce the marbleized product.

The foregoing Examples 11 to 15, inclusive, are provided to show the preparation of the modified reactant base slurry containing particulate polyvinyl chloride. Thus, the selection and addition thereto of the pigmented ribbon sections to produce the desired marbleized product is obvious to one skilled in the art from the instant generic disclosure and foregoing illustrative Examples 1 to 10, inclusive, whereby further illustrative examples to this feature of the invention is deemed unnecessary.

As noted hereinabove the exposure time of the pigmented ribbon sections in the base slurry composition is critical for obtaining the optimum marbleizing effect with the base composition. If exposure time is too short, the pigmented ribbon sections will have too little bleeding effect and merely appear as one plastic composition imbedded in a different plastic matrix. Conversely if the exposure time is too long, the pigmented ribbon sections will show an excess bleeding effect and in extreme cases be dissolved to such an extent that the added pigmented ribbon colors are mixed throughout the entire product giving an overall relatively uniform resultant color effect as would be obtained by uniformly mixing all of the pigments or color bodies homogeneously prior to casting the product. The optimum critical exposure time for any given base slurry composition and pigmented ribbon section composition can be readily determined from the foregoing disclosure by a test run of each component composition. When a plurality of different pigmented ribbon section compositions is used each such pigmented ribbon composition may have a different optimum exposure time for the particular base slurry composition. Any problem posed by such different exposure times can be readily resolved by adding each different pigmented ribbon composition at suitable different time increments prior to introducing the complete mixture into the polymerization mold or continuous-casting machine. An alternate and preferred method of control is to balance the rate of bleeding for each pigmented ribbon composition to effect substantially the same rate of bleeding for each such composition. This alternate procedure is effected by altering the relative amount of plasticizer in each ribbon composition to give a substantially uniform critical exposure time for all such compositions used together in the base slurry composition, since the critical exposure time can be altered as an inverse function of the plasticizer concentration, i.e. with increasing plasticizer concentration the critical optimum bleeding time is shortened.

Whereas specific pigmented ribbon dimensions are noted hereinabove [col. 21, lines 19 to 31], it should be noted that these numerical limits are those that were found to be optimum for a particular desired type marbleized product and are not to be construed as rigid dimensional limits for all uses of pigmented ribbon sections for the production of marbleized composite products as broadly disclosed herein. Ribbons with both wider and narrower, longer and shorter, and/or thicker and thinner dimensions may be employed. However any such modified dimensions normally will not be less than 25% nor more than 100% of the particular specific dimensions set out hereinabove. Thus the choice of the specific dimensions of the pigmented ribbon sections used to produce the marble-like composite compositions of this invention are well within the skill of the art in view of the instant disclosure.

From the foregoing disclosure and illustrative examples it will be apparent to one skilled in the art that the choice of finely divided pigment materials employed to produce a substantially uniform background colored highly mineral-reinforced polyacrylic product and the choice of finely divided pigment materials to produce the modifying pigmented ribbon compositions are extremely large in number and essentially limitless in combinations of pigments, whereby natural marbles can be readily simulated and numerous other color combinations and patterns can be produced which exhibit the general pattern of marble and other natural building stone. Accordingly, it will be understood that reasonable variations and modifications of the invention disclosed hereinabove are possible, whereby the specific illustrative examples set out herein are not to be construed as restrictive to the broad features of the present invention.

I claim:

1. A process for the production of a marbleized particulate mineral-reinforced polyacrylic matrix composition comprising the preparation of (I) A reactant slurry having a viscosity of at least about about 5,000 centipoise by intimately mixing
   (1) from about 25 to about 90 weight percent, based on the total reactant slurry mixture, of a finely divided particulate inorganic filler material which has been treated with a coupling agent having at least one functional group capable of reacting with an alkyl methacrylate monomer during polymerization and at least one functional group capable of reacting with the inorganic filler material, wherein the coupling agent comprises from about 0.05 to about 2 weight percent of said inorganic filler and said inorganic filler is characterized by a water solubility less than about 0.15 gram per liter, with
   (2) from about 10 to about 65 weight percent, based on the total reactant slurry mixture, of an alkyl methacrylate monomer or mixtures of alkyl methacrylate monomer, wherein the alkyl radicals of the foregoing monomers contain up to 4 carbon atoms,
   (3) up to about 10 weight percent of a synthetic elastomeric polymer selected from the group consisting of butadiene-acrylonitrile copolymers and polybutadiene, and up to about 100 weight percent of a solid finely divided particulate polyvinyl chloride polymer, each based on said alkyl methacrylate monomer,
   (4) from about 0.5 to about 3 weight percent, based on the alkyl methacrylate monomer, of a polyfunctional terminal vinylidene-group-containing crosslinking agent,
   (5) an effective amount up to about 2 weight percent, based on the alkyl methacrylate monomer, of a free-radical vinyl polymerization catalyst, and
   (6) up to about 5 weight percent, based on the total reactant slurry mixture, of a finely divided pigment or mixture of pigments selected to provide the desired uniform background color, agitating said reactant slurry to effect a uniform mixture of the component parts and subjecting said mixture to a reduced pressure to evacuate occluded gases all while maintaining the slurry temperature below the initiation temperature of the polymerization catalyst; then (II) adding to said slurry from about 0.5 to about 15 weight percent, based on the slurry, of at least one pigmented thin ribbon section wherein said ribbon sections comprise
   (1) from about 15 to about 35 weight percent of a polyvinyl chloride-polyvinyl acetate copolymer containing at least 80 mole percent polyvinyl chloride,
   (2) from about 1 to about 15 weight percent of a polyalkyl methacrylate polymer wherein the alkyl group contains up to 12 carbon atoms,
   (3) up to about 35 weight percent finely divided pigments,
   (4) from about 15 to about 35 weight percent of a finely divided precoupled inorganic mineral filler, and
   (5) from about 5 to about 30 weight percent of a liquid plasticizing compound for the vinyl polymer compositions, and incorporating the pigmented ribbon sections in the said slurry by brief mild agitation, reevacuating the system to remove any gases carried into the slurry with the pigmented ribbons, and holding the slurry-pigmented ribbon mixture for a time sufficient to effect a partial dissolution of said pigmented ribbons in said slurry, while maintaining the slurry-pigmented ribbon mixture below the initiation temperature of the polymerization catalyst; then (III) subjecting the slurry-pigmented ribbon mixture to polymerization conditions in a suitable unitary mold, or a continuous molding machine, for a sufficient time to effect the polymerization of the alkyl methacrylate monomer and crosslinking of the polymeric composition, cooling the polymerized product and removing the stone-like synthetic marbleized composition from the mold or casting machine.

2. A process according to claim 1, wherein the polymer component (3) of the reactant slurry consists of from about 20 to about 80 weight percent, based on the alkyl methacrylate monomer (2), of a solid finely divided particulate polyvinyl chloride polymer.

3. A process according to claim 2, wherein the polyvinyl chloride polymer is present in an amount from about 20 to about 50 weight percent.

4. A process according to claim 1, wherein the polymerization conditions of step III comprises heating the slurry-pigmented ribbon mixture at an initiation temperature of from about 80° to about 100° C. and maintaining said mixture within the polymerization temperature range of from about 80° to about 130° C.

5. A process according to claim 4, wherein the amount of pigmented thin ribbon section composition of step II is from about 1 to about 10 weight percent of said slurry.

6. A process according to claim 4, wherein the inorganic filler of step I-I is a silica substantially all passing a 200-mesh screen (74 microns), the alkyl methacrylate monomers of step I-2 consist of a major portion of methyl methacrylate, the crosslinking agent of step I-4 is a mono- or poly-ethylene glycol dimethacrylate, the free-radical catalyst of step I-5 is a peroxy compound, the polyalkyl methacrylate polymer of step II-2 consists of a major portion of poly-n-butylmethacrylate, and the plasticizing compound of step II-5 is butylphthalyl butylglycolate.

7. A process according to claim 6, wherein the inorganic mineral filler of step II-4 is calcium metasilicate substantially all passing a 200-mesh screen (74 microns).

8. A process according to claim 7, wherein the pigmented thin ribbon sections of step II are about 1 inch long, 0.25 inch wide, and 0.016 inch thick.

9. A process according to claim 5, wherein the finely divided particulate inorganic filler materials, inorganic mineral fillers, and pigments each are sufficiently finely divided to substantially all pass through a 200-mesh screen (74 microns).

References Cited
UNITED STATES PATENTS

| | | | |
|---|---|---|---|
| 2,615,271 | 10/1952 | Ulmer et al. | 264—73 |
| 3,324,074 | 6/1967 | McManimie | 260—41 |
| 3,422,178 | 1/1969 | Junker et al. | 264—216 |
| 3,442,851 | 5/1969 | McManimie | 260—41 |
| 3,448,073 | 6/1969 | McManimie | 260—41 |
| 3,488,246 | 1/1970 | Duggins | 264—75 |

ALLAN LIEBERMAN, Primary Examiner

U.S. Cl. X.R.

260—30.6 R, 31.8 R, 41 R, 41 A, 41 B, 41 C, 41.5 R, 41.5 A; 264—73, 216